(12) United States Patent
Tasaka

(10) Patent No.: US 10,599,295 B2
(45) Date of Patent: Mar. 24, 2020

(54) INFORMATION PROCESSING APPARATUS, INFORMATION PROCESSING METHOD, AND NON-TRANSITORY COMPUTER-EXECUTABLE STORAGE MEDIUM FOR DISPLAYING SETTING OR OPTION BUTTONS ON A CONTROL PANEL

(71) Applicant: Masaki Tasaka, Kanagawa (JP)

(72) Inventor: Masaki Tasaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 184 days.

(21) Appl. No.: 15/787,819

(22) Filed: Oct. 19, 2017

(65) Prior Publication Data

US 2018/0115664 A1 Apr. 26, 2018

(30) Foreign Application Priority Data

Oct. 26, 2016 (JP) .................................. 2016-209359

(51) Int. Cl.
*G06F 3/0482* (2013.01)
*H04N 1/00* (2006.01)
(Continued)

(52) U.S. Cl.
CPC .......... *G06F 3/0482* (2013.01); *G06F 3/0484* (2013.01); *G06F 3/1255* (2013.01);
(Continued)

(58) Field of Classification Search
CPC .... G06F 3/0482; G06F 3/0483; G06F 3/0484; G06F 3/04847; G06F 3/0485; G06F 3/1255; H04N 1/00482; H04N 2201/0094; H04N 1/00925; H04N 1/0048; B65H 2220/01
See application file for complete search history.

(56) References Cited

U.S. PATENT DOCUMENTS 6,535,229 B1 * 3/2003 Kraft ..................... G06F 3/0481
715/764
8,300,237 B2 * 10/2012 Sugi ................... H04N 1/00127
358/1.13
(Continued)

FOREIGN PATENT DOCUMENTS

JP     2009-017340     1/2009

*Primary Examiner* — Nicholas Ulrich
(74) *Attorney, Agent, or Firm* — Oblon, McClelland, Maier & Neustadt, L.L.P.

(57) ABSTRACT

An information processing apparatus includes circuitry to display a plurality of setting item buttons corresponding to a plurality of setting items in a predetermined arrangement on a screen. In response to selection of a first setting item button, the circuitry displays a plurality of option buttons corresponding to the plurality of options that a first setting item has. The circuitry determines, for each of the options of the first setting item, whether the option is in an exclusive relationship with any of currently selected options. The circuitry determines whether the first setting item button and a second setting item button are displayed on a same screen. The circuitry displays the option button corresponding to the option of the first setting item that is determined to be in the exclusive relationship as being not selectable, when the first and second setting item buttons are not displayed on the same screen.

15 Claims, 17 Drawing Sheets

(51) Int. Cl.
   *G06F 3/0484* (2013.01)
   *G06F 3/12* (2006.01)
   *G06F 3/0485* (2013.01)

(52) U.S. Cl.
   CPC ....... *H04N 1/0048* (2013.01); *H04N 1/00411* (2013.01); *H04N 1/00482* (2013.01); *H04N 1/00506* (2013.01); *G06F 3/0485* (2013.01); *H04N 2201/0094* (2013.01)

(56) References Cited

U.S. PATENT DOCUMENTS

| | | | |
|---|---|---|---|
| 2007/0146784 A1* | 6/2007 | Perry | G06Q 10/10 358/1.16 |
| 2007/0294624 A1* | 12/2007 | Singh | G06F 9/44505 715/747 |
| 2009/0009807 A1 | 1/2009 | Sugi | |
| 2009/0066640 A1* | 3/2009 | Mitsugi | H04N 1/0035 345/156 |
| 2009/0190153 A1* | 7/2009 | Nakanishi | H04N 1/00411 358/1.13 |
| 2009/0234882 A1 | 9/2009 | Ota et al. | |
| 2009/0271452 A1 | 10/2009 | Tasaka et al. | |
| 2009/0313539 A1 | 12/2009 | Ota et al. | |
| 2010/0098336 A1 | 4/2010 | Takahashi et al. | |
| 2011/0063652 A1 | 3/2011 | Nakamura et al. | |
| 2011/0276918 A1* | 11/2011 | Bennett | G06F 9/453 715/808 |
| 2013/0265606 A1* | 10/2013 | Tsuya | H04N 1/0035 358/1.15 |
| 2014/0036291 A1* | 2/2014 | Fujishita | G06K 15/005 358/1.13 |
| 2014/0198343 A1* | 7/2014 | Cho | G06F 3/1205 358/1.15 |
| 2015/0172483 A1* | 6/2015 | Kishida | H04N 1/00474 358/1.13 |
| 2015/0271353 A1 | 9/2015 | Nishimura et al. | |
| 2016/0080600 A1* | 3/2016 | Nishida | H04N 1/00925 358/1.14 |
| 2016/0139738 A1* | 5/2016 | Wever | G06F 3/04847 715/810 |
| 2016/0212114 A1 | 7/2016 | Kuroyanagi et al. | |
| 2016/0234393 A1 | 8/2016 | Kittaka et al. | |
| 2016/0306597 A1* | 10/2016 | Sakuraba | G06F 3/1255 |
| 2017/0208193 A1* | 7/2017 | Shinohara | H04N 1/00458 |

* cited by examiner

FIG. 13

| SETTING ITEM ID | NAME | POSITION | DISPLAY | HIGHLIGHTED FORMAT |
|---|---|---|---|---|
| 01 | COLOR MODE | 1 | Y | 01 |
| 02 | REDUCE/ENLARGE | 2 | Y | 02 |
| 03 | QUANTITY | 3 | Y | 02 |
| 04 | DENSITY | 4 | Y | 02 |
| 05 | TRAY | 5, 6 | Y | 02 |
| 06 | STAPLE | 7 | Y | 01 |
| 07 | PUNCH | 8 | Y | 01 |
| 08 | COLLATE | 9 | Y | 01 |
| 09 | 2-SIDED/1-SIDED | – | N | 02 |
| 10 | SLIP SHEET | 10 | Y | 01 |
| ... | ... | ... | ... | ... |

FIG. 14

| OPTION ID | SETTING ITEM ID | NAME | EXCLUSIVE OPTION | EXCLUSION PROCESS | SELECT |
|---|---|---|---|---|---|
| 061 | 06 | NONE | - | - | N |
| 062 | 06 | UPPER LEFT CORNER | ROTATING COLLATE | EARLIER SELECTION PRIORITIZATION PROCESS | Y |
| ... | ... | ... | ... | ... | ... |
| 081 | 08 | NONE | - | - | Y |
| 082 | 08 | COLLATE | COPY, BLANK | EARLIER SELECTION PRIORITIZATION PROCESS | N |
| 083 | 08 | ROTATING COLLATE | UPPER LEFT CORNER | EARLIER SELECTION PRIORITIZATION PROCESS | N |
| 091 | 09 | 2-SIDED | - | - | Y |
| 092 | 09 | 1-SIDED | - | - | N |
| 101 | 10 | NONE | - | - | N |
| 102 | 10 | COPY | COLLATE | LATER SELECTION PRIORITIZATION PROCESS | N |
| 103 | 10 | BLANK | COLLATE | LATER SELECTION PRIORITIZATION PROCESS | Y |
| ... | ... | ... | ... | ... | ... |

FIG. 15

| HIGHLIGHTED FORMAT | NAME | DETERMINATION CONDITION |
|---|---|---|
| 01 | ENTIRETY | UPPER ONE THIRD OR LOWER ONE THIRD |
| 02 | UPPER LEFT CORNER | UPPER ONE THIRD |
| ... | ... | ... |

INFORMATION PROCESSING APPARATUS, INFORMATION PROCESSING METHOD, AND NON-TRANSITORY COMPUTER-EXECUTABLE STORAGE MEDIUM FOR DISPLAYING SETTING OR OPTION BUTTONS ON A CONTROL PANEL

CROSS-REFERENCE TO RELATED APPLICATION

This patent application is based on and claims priority pursuant to 35 U.S.C. § 119(a) to Japanese Patent Application No. 2016-209359, filed on Oct. 26, 2016 in the Japan Patent Office, the entire disclosure of which is hereby incorporated by reference herein.

BACKGROUND

Technical Field

The present disclosure relates to an information processing apparatus, an information processing method, and a non-transitory computer-executable storage medium.

Description of the Related Art

A multi-functional peripheral having a touch panel configured as a control panel is now in widespread use. When a user selects a desired setting item button displayed on the control panel, one or more option buttons are displayed, each corresponding to an option of a setting item corresponding to the desired setting item button. When a user selects a desired option button from the option buttons displayed on the control panel, an option corresponding to the selected option button is selected as a setting value for the setting item. The setting item button corresponding to the setting item for which the setting value is selected is highlighted, indicating that the setting value is currently being selected.

In a case in which a given option is selected for a given setting item while a setting item button corresponding to a different setting item for which a different option is previously selected is highlighted, and the previously selected option and the given option are mutually exclusive, the previously selected option is sometimes deselected. The setting item button corresponding to the previously selected option is referred to as a "previous setting item button". In this case, the display of highlight applied to the previous setting item button is cancelled. As a result, display of the previous setting item button is dehighlighted, indicating that the button is not currently being selected. The user is able to recognize that the previously selected option is deselected by viewing that display of the previous setting item button is switched from highlighted to dehighlighted.

SUMMARY

An information processing apparatus includes circuitry. The circuitry displays, on a display, a plurality of setting item buttons corresponding to a plurality of setting items in a predetermined arrangement on a screen, each setting item having a plurality of options. In response to selection of a first setting item button from among the plurality of setting items buttons, the circuitry displays a plurality of option buttons corresponding to the plurality of options that a first setting item corresponding to the selected first setting item button has. The circuitry determines, for each of the plurality of options that the first setting item has, whether the option is in an exclusive relationship with any of options that are currently being selected. The circuitry determines whether the first setting item button and a second setting item button corresponding to a second setting item are displayed on a same screen, the second setting item being a setting item having a currently selected option that is determined to be in the exclusive relationship with any option of the first setting item. The circuitry displays the option button corresponding to the option of the first setting item that is determined to be in the exclusive relationship with the currently selected option, as being not selectable, when the first setting item button and the second setting item button are not displayed on the same screen.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 13 illustrates an example of a setting item table according to an embodiment of the present disclosure;

FIG. 14 illustrates an example of an option table according to an embodiment of the present disclosure;

FIG. 15 illustrates an example of a highlighted format table according to an embodiment of the present disclosure;

Figure 1:
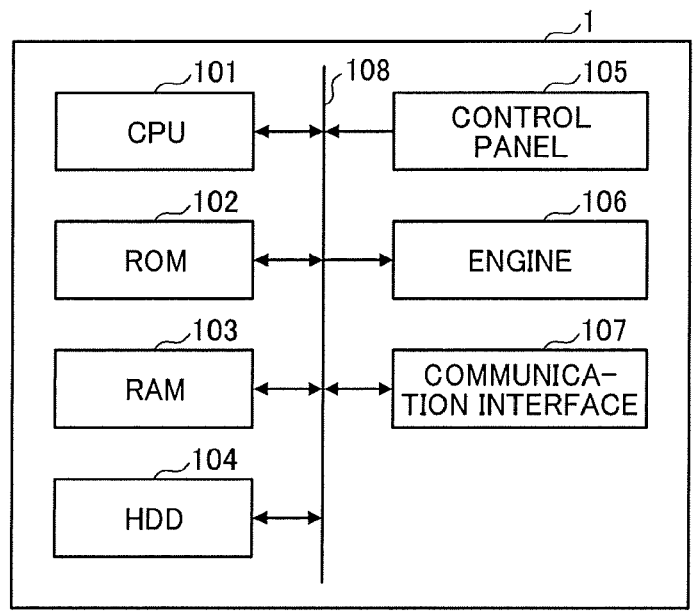
FIG. 1 is a block diagram illustrating an example of hardware configuration of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Hereinafter, a description is given of several embodiments of the present disclosure with reference drawings. In the following description of embodiments and the drawings, the same reference numbers are allocated to elements (members or components) having the same function or shape and redundant descriptions thereof are omitted.

First Embodiment

A description is given of an information processing apparatus 1 according to a first embodiment with reference to FIGS. 1 to 19. The information processing apparatus 1 according to the present embodiment is any suitable apparatus including a touch panel configured as a control panel. Examples of the information processing apparatus 1 include, but not limited to, an image forming apparatus, electronic information board, digital camera, refrigerator, washing machine, microwave oven, and television. Examples of the image forming apparatus include a multifunctional peripheral, (MFP), printer, a copier, fax machine, and scanner. In the following, a description is given of an image forming apparatus as an example of the information processing apparatus 1. The image forming apparatus as an example of the information processing apparatus 1 is referred to as an "image forming apparatus 1" hereinafter.

First, a description is given of a hardware configuration of the image forming apparatus 1 according to the first embodiment. FIG. 1 is a block diagram illustrating an example of hardware configuration of the image forming apparatus 1. The image forming apparatus 1 of FIG. 1 includes a central processing unit (CPU) 101, a read only memory (ROM) 102, a random access memory (RAM) 103, and hard disc drive (HDD) 104. The image forming apparatus 1 further includes a control panel 105, an engine 106, a communication interface 107, and a bus 108. The image forming apparatus 1 also includes a printer, a copier, a facsimile, and a scanner, depending on the type of image forming apparatus 1.

The CPU 101 executes a program to control the elements to implement functions of the image forming apparatus 1. The ROM 102 stores various data including the program executed by the CPU 101. The RAM 103 provides a work area for the CPU 101. The HDD 104 stores various data including the program executed by the CPU 101. The control panel 105 is an input/output device including a touch panel and a display. The control panel 105 accepts a user instruction through the touch panel to input various data to the image forming apparatus 1. Further, the control panel 105 displays various data stored in the image forming apparatus 1 on the display. The control panel 105 may include a hardware key as the input device. The engine 106 controls the printer, copier, facsimile and scanner, for example, to implement functions corresponding to the devices (printer function, copier function, facsimile function, and scanner function). The communication interface 107 is an interface device to connect the image forming apparatus 1 to a network such as the Internet and a local area network (LAN). The image forming apparatus 1 communicates with an external device on the network via the communication interface 107. The bus 108 connects the CPU 101, the ROM 102, the RAM 103, the HDD 104, the control panel 105, the engine 106, and the communication interface 107, with one another.

Next, a description is given of a screen displayed on the control panel 105. More specifically, descriptions are given hereinafter of a home screen, an application screen, and a setting screen.

The home screen is a screen that enables a user to select a function that the user wants to use. The home screen includes one or more icons corresponding to one or more functions that the user can use. The icon is a button (graphical image), when selected, to activate an application that implements the corresponding function. When the user selects a desired icon, an application that implements a function corresponding to the selected icon is activated, and an application screen of the activated application is displayed. In this disclosure, selection of the button displayed on the control panel 105 may be implemented though touching the button by the user or operating a hardware key by the user.

Figure 2:
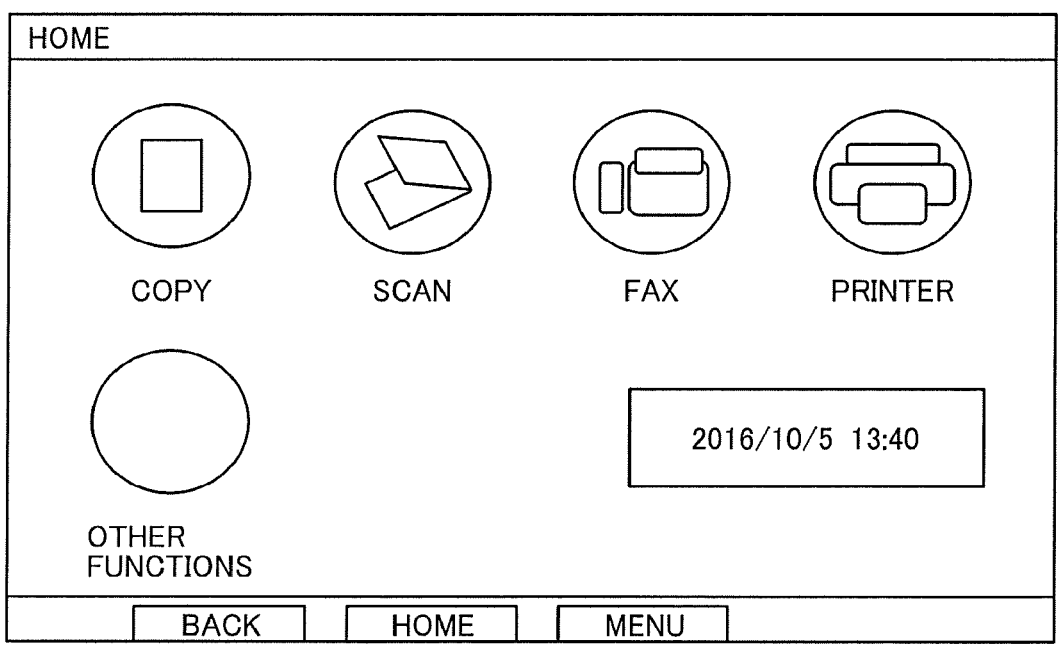
FIG. 2 illustrates an example of a home screen according to an embodiment of the present disclosure.

FIG. 2 illustrates an example of the home screen. A copy icon, a scan icon, a fax icon, a printer icon, and other functions icon are displayed on the home screen of FIG. 2. For example, when a user selects the copy icon, a copier application that implements a copier function starts up, and an application screen of the copier function is displayed.

In addition, on the home screen of FIG. 2, a widget displaying the date and time, a BACK button for returning to a previous screen, a HOME button for transiting to the home screen, and a MENU button for displaying a menu screen are displayed. The home screen illustrated in FIG. 2 is just one example, and any suitable button may be added or deleted to and from the home screen.

The application screen is a screen that enables a user to select a setting item for which the user wants to specify a setting value. A plurality of setting item buttons corresponding to different setting items that the user can select are displayed on the application screen. The setting item button is a button that enables a user to select a setting item. The selection of setting item button corresponds to selection of the setting item. When a user selects a desired setting item button, a setting screen of the setting item corresponding to the selected setting item button is displayed.

Each of the plurality of setting items has a plurality of options (candidates for a setting value). A setting value for a setting item is selected from the options that the setting item has. The selected option is selected as a setting value of the setting item. In other words, the selection of option corresponds to the selection of setting value. Further, for each of the setting items, an option that is selected by default as a setting value is determined in advance. The option that is selected as a setting value by default is referred to as a "default value" hereinafter.

Figure 3:
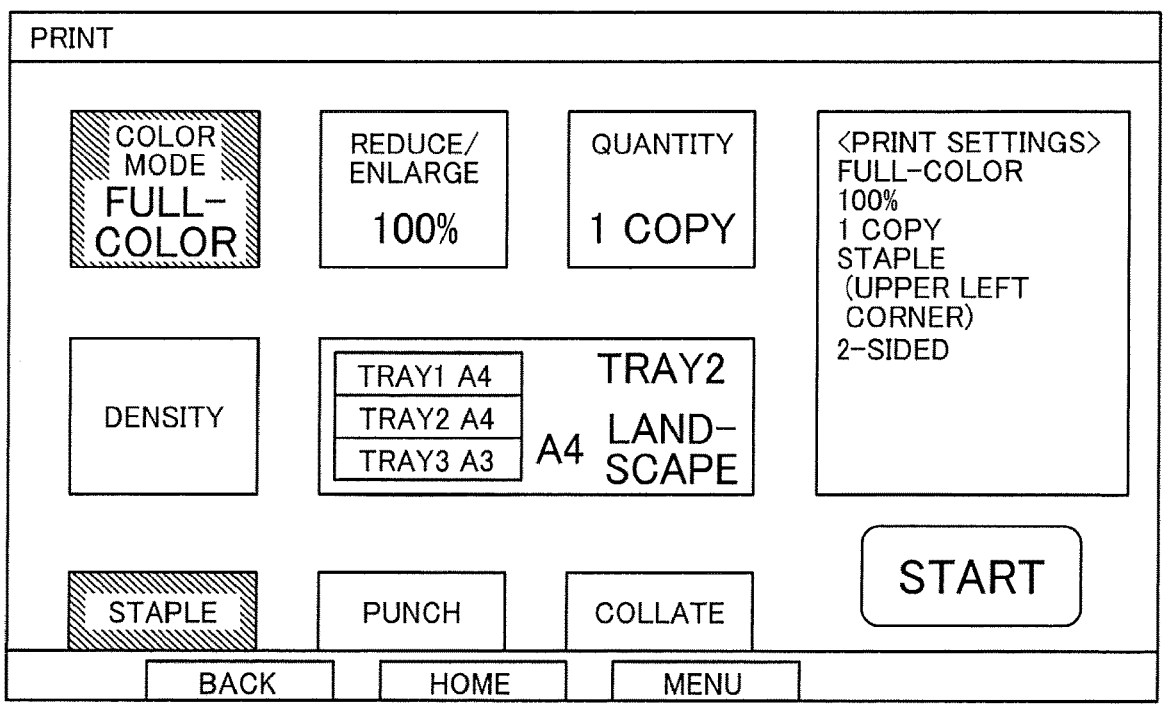
FIG. 3 illustrates an example of an application screen according to an embodiment of the present disclosure.

FIG. 3 illustrates an example of the application screen. The application screen of FIG. 3 is an application screen for the copier application (copier function). On the application screen of FIG. 3, eight setting item buttons are displayed, which respectively correspond to the setting items "color mode", "reduce/enlarge", "quantity", "density", "tray", "staple", "punch" and "collate". In an example of FIG. 3, in each of the setting item buttons, text representing the corresponding setting item and setting value (option that is currently being selected) is displayed. In the following description, a setting item button corresponding to a setting item "X" is referred to as an X button.

For example, a setting item button displayed at the upper left corner of the application screen of FIG. 3 is referred to as a "color mode button". This color mode button is a setting item button corresponding to the setting item "color mode". The setting item "color mode" has "full-color", "monochrome" (which is the default value), and "gray scale" as the options. In an example of FIG. 3, text "FULL-COLOR" is displayed in the color mode button. This indicates that an option "full-color", which is an option other than the default value, is currently being selected as a setting value of the setting item "color mode".

Further, a setting item button displayed at the lower right corner of the application screen of FIG. 3 is referred to as a "staple button". This staple button is a setting item button corresponding to the setting item "staple". The setting item "staple" as "none" (which is the default value) and "upper left corner" as the options. In an example of FIG. 3, an option "upper left corner", which is an option other than the default value, is currently being selected as a setting value of the setting item "staple". However, because a part of the staple button is arranged outside the application screen, "upper left corner" representing the setting value is not displayed on the screen.

By contrast, for each of the setting items "reduce/enlarge", "quantity", "density", "tray", "punch" and "collate", the default value is selected as a setting value. In an example of FIG. 3, the tray button does not include text "tray" representing the setting item. This is because a user can recognize a setting item corresponding to the displayed setting item button when viewing the setting value.

In this embodiment, as illustrated in FIG. 3, a setting item button corresponding to the setting item for which an option other than the default value is selected is displayed in a manner different from a setting item button corresponding to the setting item for which the default value is selected. The setting item for which the default value is selected is usually referred to as a "default setting item". In the following description, the manner in which the setting item button corresponding to the setting item for which an option other than the default value is selected is referred to as a "highlighted format". By contrast, the manner in which the setting item button corresponding to the default setting item is displayed is referred to as a "unselected format" hereinafter.

In an example of FIG. 3, the setting item button displayed in the unselected format is displayed in its entirety in a predetermined color (referred to as "unselected color", hereinafter). The unselected color is white, for example. By contrast, the setting item button displayed in the highlighted format is displayed in its entirety in a predetermined color (referred to as "selected color", hereinafter) that is different from the unselected color. The selected color is yellow, for example. In an example of FIG., 3, the color mode button and the staple button are displayed in the highlighted format, while the reduce/enlarge button, the quantity button, the density button, the tray button, the punch button and the collate button are displayed in the unselected format. This is because an option other than the default value is selected for each of the setting items "color mode" and "staple", while a default value is selected for each of the setting items "reduce/enlarge", "quantity", "density", "tray", "punch" and "collate".

FIGS. 4A to 4G are views, each illustrating an example of the highlighted format. In the highlighted format of FIG. 4A, the setting item button is displayed in the selected color in its entirety, in the same manner as FIG. 3. In the highlighted format of FIG. 4B, the upper-left portion of the setting item button is displayed in the selected color. In the highlighted format of FIG. 4C, the lower-right portion of the setting item button is displayed in the selected color. In the highlighted format of FIG. 4D, the outer edge portion of the setting item button is displayed in the selected color. In the highlighted format of FIG. 4E, the upper portion of the setting item button is displayed in the selected color. In the highlighted format of FIG. 4F, the lower portion of the setting item button is displayed in the selected color. In the highlighted format of FIG. 4G, the left side portion of the setting item button is displayed in the selected color.

In the present embodiment, one or more types of highlighted formats are prepared, as illustrated in FIGS. 4A to 4G. The type of highlighted format to be used is set to the setting item button that uses the highlighted format.

Further, on the application screen of FIG. 3, a print setting field and a start button are displayed. In the print setting field, the options that are currently being selected are displayed. The start button, when selected, causes the image forming apparatus 1 to start printing. According to the print setting field of FIG. 3, it can been seen that the options "full-color", "100%", "1 copy", "staple" and "2-sided" are currently being selected.

In addition, on the application screen of FIG. 3, a BACK button for returning to a previous screen, a HOME button for transiting to the home screen, and a MENU button for displaying a menu screen are displayed. The application screen illustrated in FIG. 3 is just one example, and any suitable button may be added or deleted to and from the application screen.

The setting screen is a screen that enables a user to select a setting value of the setting item. On the setting screen, a plurality of option buttons corresponding to a plurality of options that a user can select are displayed. The option button is a button that enables a user to select an option. The selection of option button corresponds to the selection of option. When a user selects a desired option button, an option corresponding to the selected option button is selected as a setting value.

Figure 5:
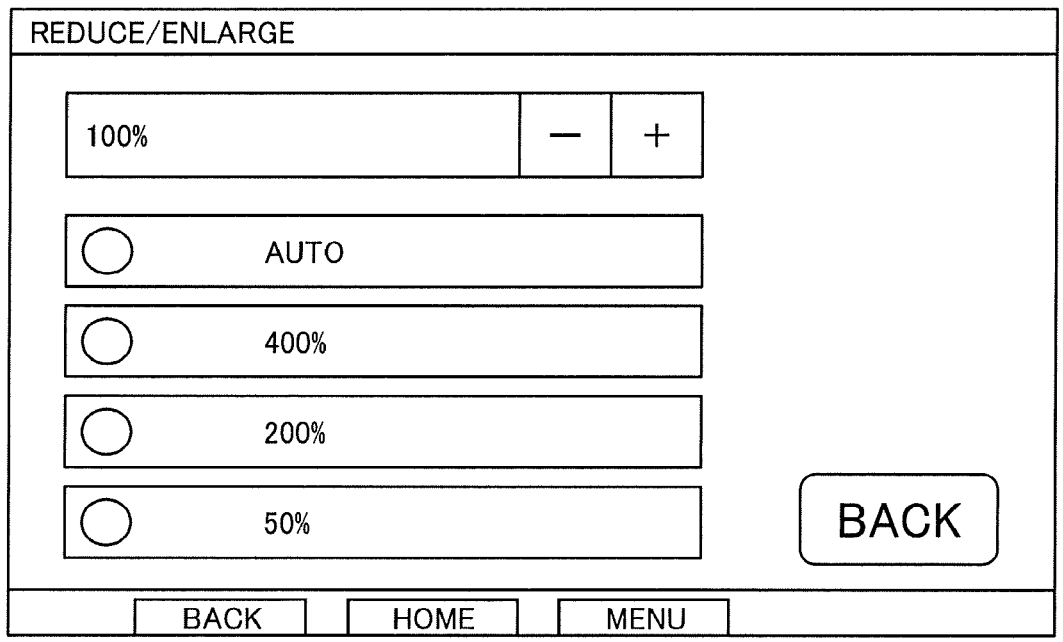
FIG. 5 illustrates an example of a setting screen according to an embodiment of the present disclosure.

FIG. 5 illustrates an example of the setting screen. On the setting screen of FIG. 5, option buttons corresponding to the options "Auto", "400%", "200%" and "50%" are displayed. In an example of FIG. 5, in each of the option buttons, text representing the corresponding option is displayed. In the following description, an option button corresponding to an option "X" is referred to as an X button. For example, an option button displayed at the top of the setting screen of FIG. 5 is referred to as an "auto button". This auto button is an option button corresponding to the option "Auto".

Further, on the setting screen of FIG. 5, a BACK button for returning to the application screen and a magnification display field for displaying a magnification that is currently being set are displayed. In an example of FIG. 5, 100% is currently being set as a magnification. In addition, the magnification display field of FIG. 5 includes a plus button and a minus button, each being selected for changing the magnification that is currently being set. When a user selects a 400% button on this setting screen, 400% is selected as a setting value of the magnification, and text 400% is displayed in the magnification display field.

Furthermore, on the setting screen of FIG. 5, a BACK button for returning to a previous screen, a HOME button for transiting to the home screen, and a MENU button for displaying a menu screen are displayed. The setting screen illustrated in FIG. 5 is just one example, and any suitable button may be added or deleted to and from the setting screen.

Hereinafter, a description is given of an exclusive relationship between options. The exclusive relationship between options is a relationship that can be established between two options that different setting items have. Two options are mutually exclusive (that is, the exclusive relationship is established between two options), when one of the two options cannot be selected while the other one is being selected. The exclusive relationship is preset based on the specification of the image forming apparatus 1 and the properties of the options themselves. Examples of two options that are mutually exclusive include sets of "rotating collate" and "staple", "stack" and "staple", "series" and "binding", and "binding" and "spread duplex". This option "staple" includes any desired options that use a staple function.

A process relating to two options that are mutually exclusive is referred to as an exclusion process. The exclusion process includes an earlier-selection prioritization process and a later-selection prioritization process.

The earlier-selection prioritization process is a process that disenables selection of one option that is selected after the selection of the other option. This disenabling selection means that the image forming apparatus 1 does not accept the selection of an option even when a user selects the option. According to the earlier-selection prioritization process, one option cannot be selected until the other option that is previously selected is deselected.

The later-selection prioritization process is a process that enables selection of one option that is selected after the selection of the other option. According to the later-selection prioritization process, when one option is selected while the other option is being selected, the other option is automatically deselected.

A setting whether to apply the earlier-selection prioritization process or the later-selection prioritization process is configured in advance for an option that is in an exclusive relationship with the other option. The exclusion processes applied to two options that are mutually exclusive may be the same type (that is, one of the earlier-selection prioritization process and the later-selection prioritization process) or different from each other.

Next, a description is given of an overview of the image forming apparatus 1 according to the first embodiment. In the present embodiment, a description is given of an example case of the option to which the later-selection prioritization process is applied. Hereinafter, a description is given of an example of the "upper left corner" as an option of the setting item "staple" and the "rotating collate" as an option of the setting item "collate". The option "upper left corner" is an option that indicates binding sheets together with a staple at the upper left corner of sheets. In this example, the options "upper left corner" and "rotating collate" are mutually exclusive. Further, in this example, the later-selection prioritization process is applied to the option "upper left corner".

FIGS. 6 to 10 illustrate transition of the application screen in the known image forming apparatus. In FIGS. 6 to 10, the setting items other than the staple button and the collate button are omitted in order to simplify the description and drawings.

Figure 6:
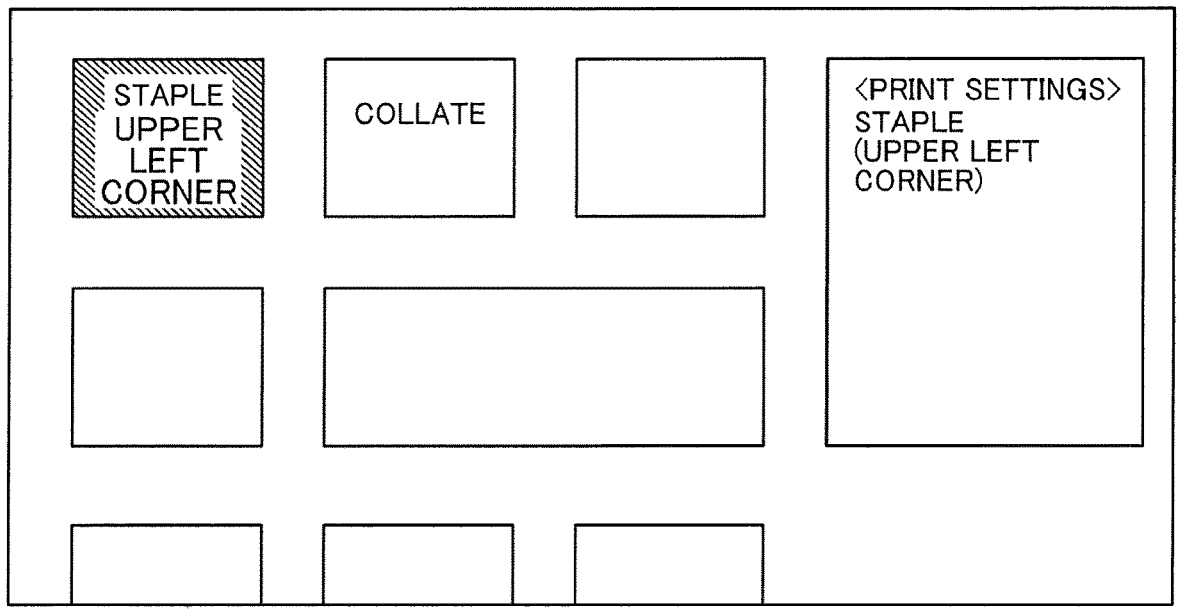
FIG. 6 illustrates transition of the application screen in a known image forming apparatus.
Figure 7:
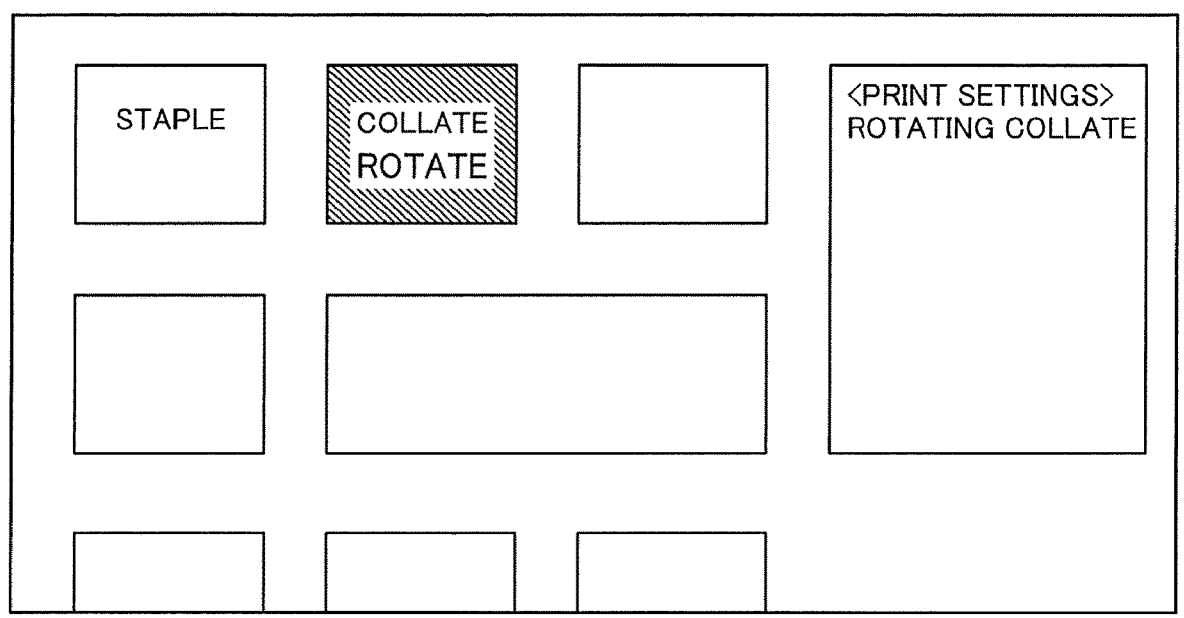
FIG. 7 illustrates transition of the application screen in a known image forming apparatus.

FIGS. 6 and 7 each illustrates an example of the application screen on which the staple button and the collate button are displayed on the same screen. In a case in which the default value is selected for each of the setting items "staple" and "collate", the application screen of FIG. 6 is displayed in response to a user selection of the option "upper left corner" as a setting value of the setting item "staple". On the application screen of FIG. 6, the staple button is displayed in the highlighted format while the collate button is displayed in the unselected format.

Next, the application screen of FIG. 7 is displayed in response to a user selection of the option "rotating collate" as a setting value of the setting item "collate". On the application screen of FIG. 7, the staple button is displayed in the unselected format while the collate button is displayed in the highlighted format. This is because the option "upper left corner" is automatically deselected by the selection of option "rotating collate".

As illustrated in FIGS. 6 and 7, the display format of the staple button changes from the highlighted format to the unselected format before and after the selection of the option "rotating collate". A user can easily recognize that the option "upper left corner" has been deselected when looking at this change of display format on the application screen.

Figure 8:
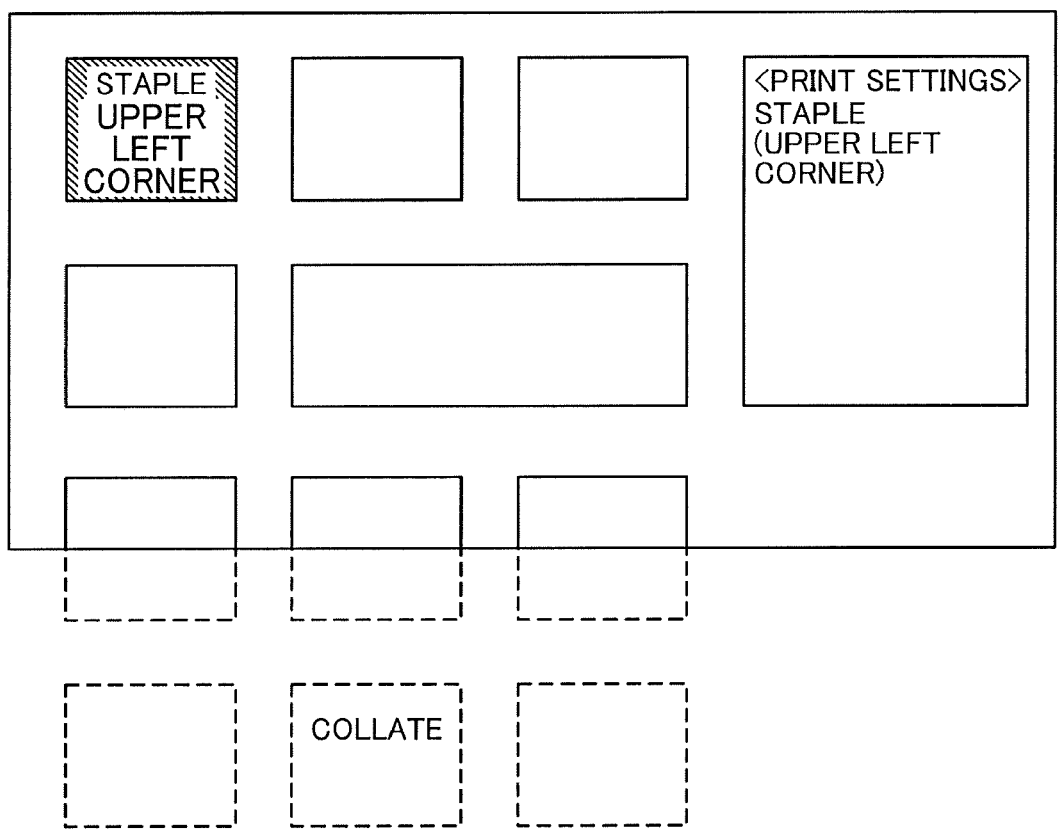
FIG. 8 illustrates transition of the application screen in a known image forming apparatus.
Figure 9:
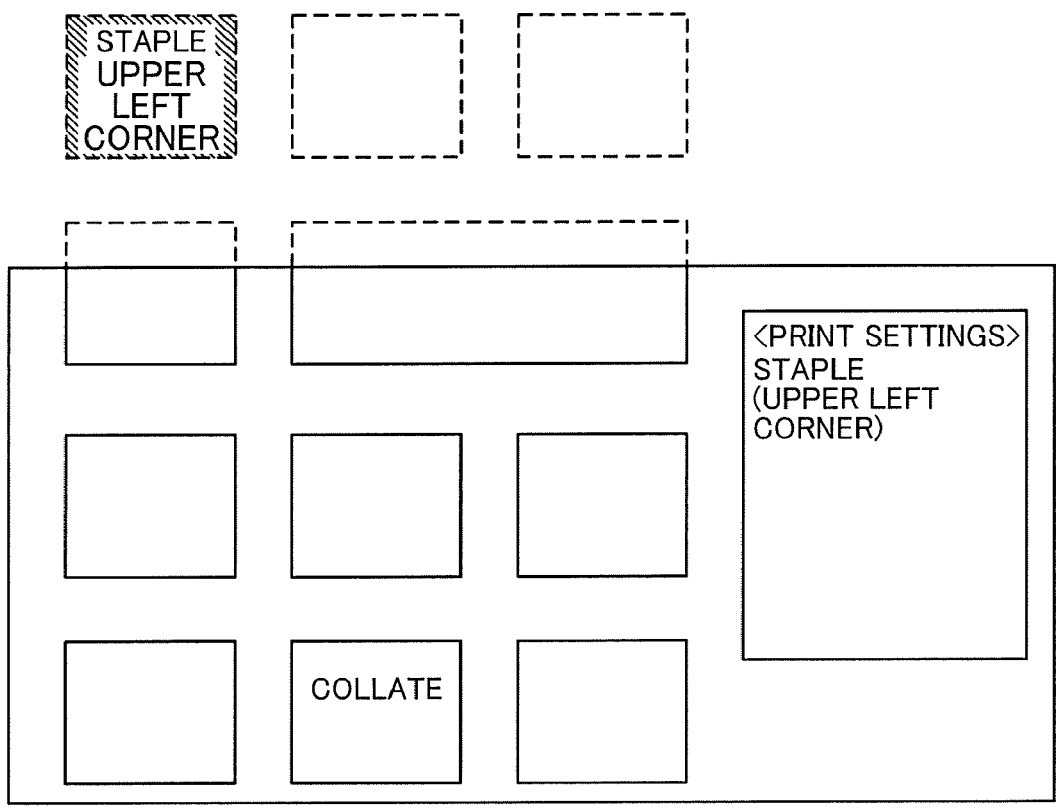
FIG. 9 illustrates transition of the application screen in a known image forming apparatus.
Figure 10:
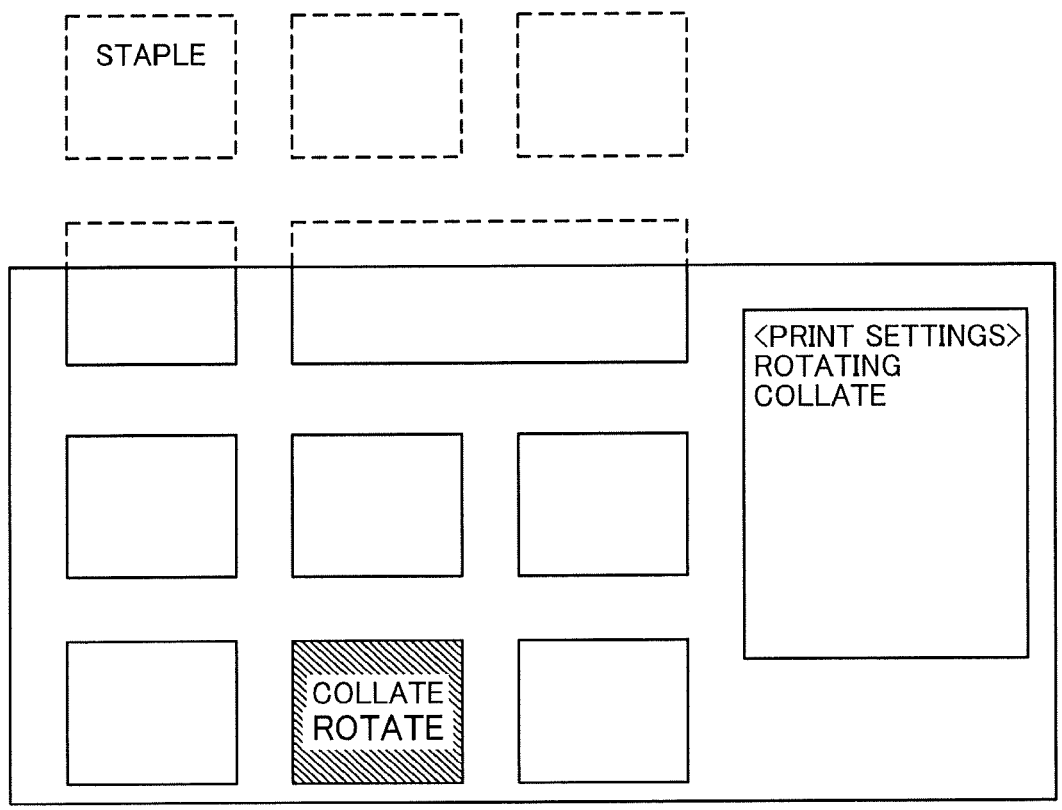
FIG. 10 illustrates transition of the application screen in a known image forming apparatus.

By contrast, FIGS. 8 to 10 illustrate examples of the application screen on which the staple button and the collate button are not displayed on the same screen. In FIGS. 8 to 10, parts of the setting item buttons that are not displayed on the application screen are indicated by a broken line. In a case in which the default value is selected for each of the setting items "staple" and "collate", the application screen of FIG. 8 is displayed in response to a user selection of the option "upper left corner" as a setting value of the setting item "staple". On the application screen of FIG. 8, the staple button is displayed in the highlighted format. At this time, the collate button is not displayed on the application screen because the collate button is arranged outside the application screen.

Next, a user scrolls the application screen to have the collate button appear on the application screen in order to select a setting value of the setting item "collate". In response to this user operation, the application screen of FIG. 9 is displayed. On the application screen of FIG. 9, the collate button is displayed in the unselected format. On the other hand, the staple button is not displayed on the application screen, because the staple button is arranged outside the application screen.

Thereafter, the application screen of FIG. 10 is displayed in response to a user selection of the option "rotating collate" as a setting value of the setting item "collate". On the application screen of FIG. 10, the collate button is displayed in the highlighted format. On the other hand, the staple button is not displayed on the application screen, because the staple button is arranged outside the application screen.

As illustrated in FIGS. 9 and 10, the staple button is not displayed on the application screen before and after the selection of the option "rotating collate". In this case, a user is not able recognize that the cancellation of selection of option "upper left corner", because the user cannot see the change of display format of the staple button.

As described above, in the known image forming apparatus, a user has difficulty in recognize that the option "upper left corner" is deselected, in a case in which the staple button and the collate button are not displayed on the same screen. In other words, a user is likely to miss the change of setting value (cancellation of selection of the option "upper left corner").

To address this issue, the image forming apparatus 1 according to the present embodiment displays the option "rotating collate" as being not selectable on the setting screen of the setting item "collate", in a case in which the staple button and the collate button are not displayed on the same screen. In other words, the image forming apparatus 1 automatically changes the exclusion process applied to the option "upper left corner" from the later-selection prioritization to the earlier-selection prioritization process. This prevents a user from overlooking the change of setting value, because the option "upper left corner" is not deselected automatically.

Figure 11:
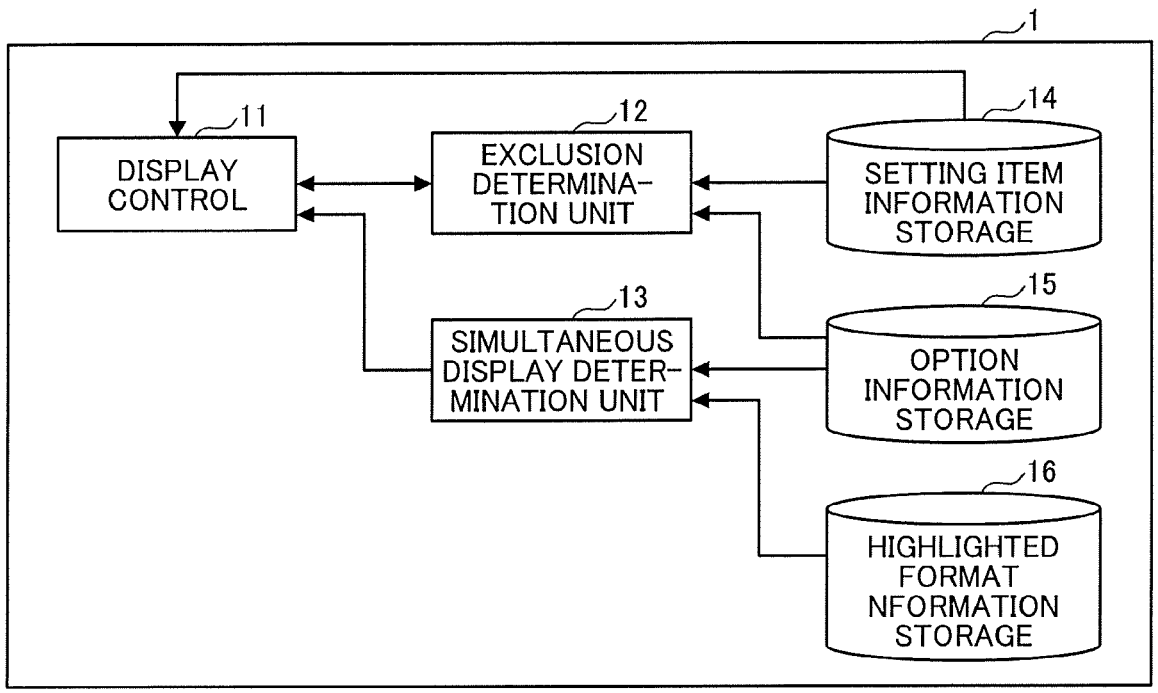
FIG. 11 is a block diagram illustrating an example of functional configuration of the image forming apparatus according to an embodiment of the present disclosure.

Hereinafter, a description is given of a functional configuration of the image forming apparatus 1. FIG. 11 is a block diagram illustrating an example of functional configuration of the image forming apparatus 1. The image forming apparatus 1 of FIG. 11 includes a display control 11, an exclusion determination unit 12, a simultaneous display determination unit 13, a setting item information storage 14, an option information storage 15, and a highlighted format information storage 16. Each of these functional units is implemented by the CPU 101, when executing according to the program that is loaded from the ROM 102 or the HDD 104 to the RAM 103.

The display control 11 controls a screen displayed on the display of the control panel 105. More specifically, in response to a user selection of an icon on the home screen, the display control 11 switches the home screen to the application screen of a function (application) corresponding to the selected icon. Further, in response to a user selection of a setting item button on the application screen, the display control 11 switches the application screen to a setting screen of a setting item corresponding to the selected setting item button. Furthermore, in response to a user selection of the BACK button on any one of the screens, the display control 11 switches the currently displayed screen to the screen previously displayed. In response to selection of the BACK button on the setting screen, the setting screen is switched to the application screen.

In addition, the display control 11 arranges parts such as buttons and widgets displayed on the screen, displays text inside the parts or a text field, or performs screen control according to a user operation (scrolling, enlargement, reduction, etc.), for example.

The exclusion determination unit 12 determines whether a first setting item has a first option. The first setting item is a setting item corresponding a first setting item button. The first setting item button is a setting item bottom that is selected by a user on the application screen. This determination is referred to as exclusion determination. The first option is an option that has an exclusive relationship with any of the options currently being selected that the setting item other than the first setting item has.

The simultaneous display determination unit 13 determines whether the first setting item button and a second setting item button are displayed on the same screen. In other words, the simultaneous display determination unit 13 determines whether the first setting item button and the second setting item button are simultaneously displayed on the application screen. This determination is referred to as simultaneous display determination. The second setting item button is a setting item button corresponding to a second setting item. The second setting item is a setting item that has a second option. The second option is a currently selected option that is in an exclusive relationship with the first option.

The simultaneous display determination unit 13 performs the above determination when the first setting item button is selected. This presumes that the first setting item button is displayed on the application screen at the time of determination. Accordingly, the simultaneous display determination unit 13 only has to determine whether the second setting item button is displayed on the application screen at the time of determination.

When the determination result indicates that the second setting item button is displayed on the application screen, the result means that the first setting item button and the second setting item button are displayed on the same screen. By contrast, when the determination result indicates that the second setting item button is not displayed on the application screen, the result means that the first setting item button and the second setting item button are not displayed on the same screen. The determination as to whether or not the second setting item button is displayed on the application screen is made in the following two methods.

In a first method, when the entire second setting item button is displayed on the application screen, it is determined that the second setting item button is displayed on the application screen. In this method, when there is a part of the second setting item that is not displayed on the application screen, it is determined that the second setting item button is not displayed on the application screen. This determination method does not depend on the highlighted format that is set to the second setting item button. In other words, this determination method can be used for the second setting item button to which a desired type of the highlighted format is set.

In a second method, when a predetermined portion of the second setting item button is displayed on the application screen, it is determined that the second setting item button is displayed on the application screen. In this method, when the predetermined portion of the second setting item buttons is not displayed on the application screen, it is determined that the second setting item button is not displayed on the application screen. Since the predetermined portion is set for each type of highlighted formats, this determination method depends on the type of highlighted format that is set to the second setting item button.

Figure 4A:
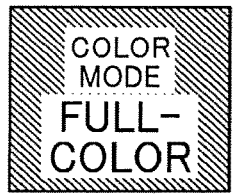
FIGS. 4A to 4G are views, each illustrating an example of a highlighted format according to an embodiment of the present disclosure.
Figure 4B:
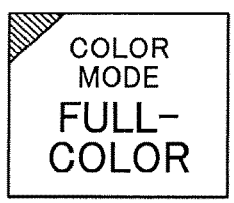
Figure 4C:
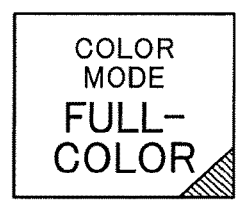
Figure 4D:
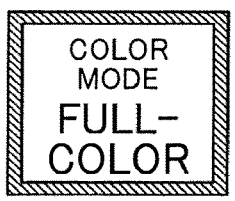
Figure 4E:
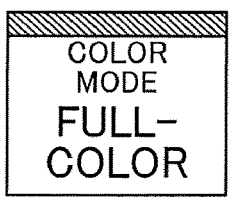
Figure 4F:
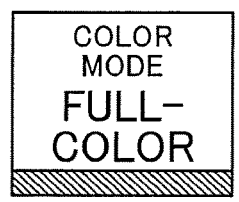
Figure 4G:
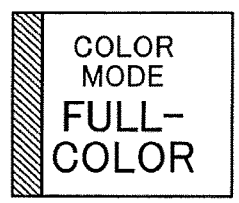
Figure 12:
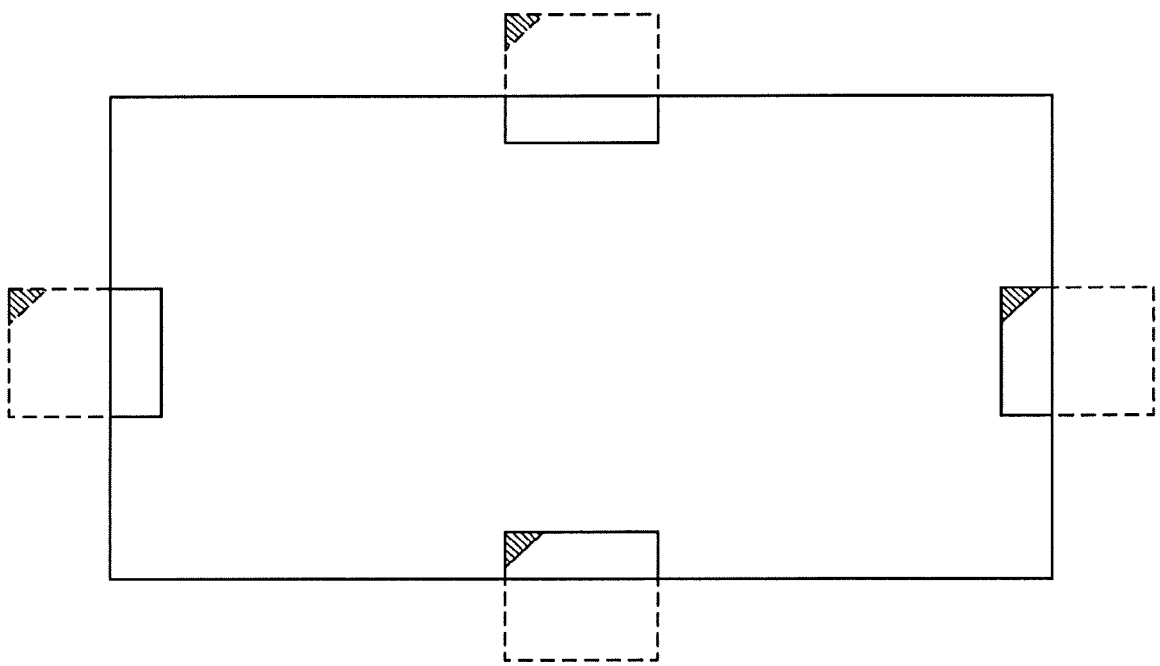
FIG. 12 illustrates an example of relative positions of a second setting item button and the application screen according to an embodiment of the present disclosure.

A description is given of an example case in which the highlighted format of FIG. 4B is set to the second setting item button. FIG. 12 illustrates an example of the relative positions of the second setting item button and the application screen. In FIG. 12, a part of the second setting item button that is not displayed on the application screen is indicated by a broken line.

As illustrated in FIG. 12, in a case in which the highlighted format of FIG. 4B is set to the second setting item button, a user cannot tell whether a setting value is being selected, even when the lower or right portion of the second setting item button is displayed on the application screen. By contrast, when the upper or left portion of the second setting item button is displayed on the application screen, a user can tell whether the setting value is currently being selected. This is because the upper left corner of the second setting item button is displayed in the selected color in the highlighted format of FIG. 4B. Accordingly, when the upper or left portion of the second setting item button is displayed on the application screen, a user can visually recognize the change of the display format of the second setting item button. However, even when the upper or left portion of the second setting item button is displayed on the application screen, the user may miss the change of the display format if the displayed portion is too small. To address this issue, a predetermined ratio (for example, one-third) of the upper or left portion to the entire second setting item button is set as the predetermined portion in the highlighted format of FIG. 4B.

Thus, as the predetermined portion of the highlighted format, a predetermined ratio of a portion containing a portion displayed in the selected color to the entire second setting item button is set. For example, an upper one-third portion of the second setting item button is set as the predetermined portion in the highlighted format of FIGS. 4A, 4B, 4D, 4E, and 4G. Further, for example, a left one-third portion of the second setting item button is set as the predetermined portion in the highlighted format of FIGS. 4A, 4B, 4D, 4E, 4F, and 4G. Furthermore, for example, a right one-third portion of the second setting item button is set as the predetermined portion in the highlighted format of FIGS. 4A, 4C, 4D, 4E, and 4F. Furthermore, for example, a lower one-third portion of the second setting item button is set as the predetermined portion in the highlighted format of FIGS. 4A, 4C, 4D, 4F, and 4G.

When the application screen is scrollable up and down, it is preferable to set at least one of the upper portion and the lower portion of the second setting item button as the predetermined portion. Further, when the application screen is scrollable horizontally, it is preferable to set at least one of the left portion and the right portion of the second setting item button as the predetermined portion.

The setting item information storage 14 stores information related to each setting item (hereinafter referred to as "setting item information"). FIG. 13 illustrates an example of a setting item table storing the setting item information. Each record of FIG. 13 corresponds to the setting item information of each setting item. In an example of FIG. 13, the setting item information includes, as information items, a "setting item ID", a "name, a "position", a "display", and a "highlighted format ID". The "setting item ID" is an identifier for identifying a setting item. The "name" is a name of setting item.

The "position" is a position at which a setting item button corresponding to the setting item is displayed. This position is a position in an arrangement area that is prepared in advance for arranging the setting item buttons. In the present embodiment, the arrangement area that is capable of arranging the setting item buttons in N rows and three columns is prepared. The "position" at the upper left corner of the arrangement area is "1", and "position" at the upper right corner is "3". On the application screen, a part of the arrangement area in which each setting item button is arranged at a predetermined position is displayed. In the table of FIG. 13, the "position" of the setting item "tray" is "5, 6". This indicates that the tray button straddles the two positions.

The "display" indicates whether a setting item button corresponding to the setting item is to be displayed on the application screen. "Y" in the "display" indicates that the setting item button is to be displayed, while "N" indicates that the setting item button is not be displayed. The "highlighted format ID" is an identifier for identifying the type of highlighted format that is set to the setting item.

The option information storage 15 stores information related to each option (hereinafter referred to as "option information"). FIG. 14 illustrates an example of an option table storing the option information. Each record of FIG. 14 corresponds to the option information of each option.

In the example of FIG. 14, the option information includes, as information items, "option ID", "setting item ID", "name", "exclusive option", "exclusion process", and "select". The "option ID" is an identifier for identifying an option. The "setting item ID" is a setting item ID of a setting item having the associated option. The "name" is a name of the option. The "exclusive option" is an option that is in an exclusive relationship with the associated option. "–" in the "exclusive option" indicates that there is no option that is in an exclusive relationship with the associated option. The "exclusion process" is a type of exclusion process applied to the associated option. "–" in the "exclusion process" indicates that no exclusion process is applied to the associated option. The "select" indicates whether the associated option is currently being selected. "Y" in the "select" indicates that the option is currently being selected, while "N" indicates that the option is not currently being selected.

In an example of FIG. 14, the option information of all options is stored in a single option table. However, this is just one example. In another example, a plurality of option tables may be provided respectively for the plurality of setting items.

The highlighted format information storage 16 stores information related to each highlighted format (hereinafter referred to as "highlighted format information"). FIG. 15 illustrates an example of a highlighted format table storing the highlighted format information. Each record of FIG. 15 corresponds to the highlighted format information of each highlighted format.

In an example of FIG. 15, the highlighted format information includes, as information items, a "highlighted format ID", a "name", and a "determination condition". The "highlighted format ID" is an identifier for identifying a highlighted format. The "name" is a name of highlighted format. The "determination condition" is a condition to be satisfied for determining that the setting item button to which the associated highlighted format is set is displayed on the application screen. More specifically, the determination condition indicates the above-described predetermined portion. The highlighted format identified by the highlighted format ID "01" in FIG. 15 is the highlighted format of FIG. 4A. The highlighted format identified by the highlighted format ID "02" is the highlighted format of FIG. 4B. The table of FIG. 15 is used in an example case in which the simultaneous display determination unit 13 determines whether the first setting item button and the second setting item button are simultaneously displayed on the application screen using the above-described second determination method. In another example case in which the simultaneous display determination unit 13 performs the determination using the above-described first determination method, the highlighted format information may not include the "determination condition".

Figure 16:
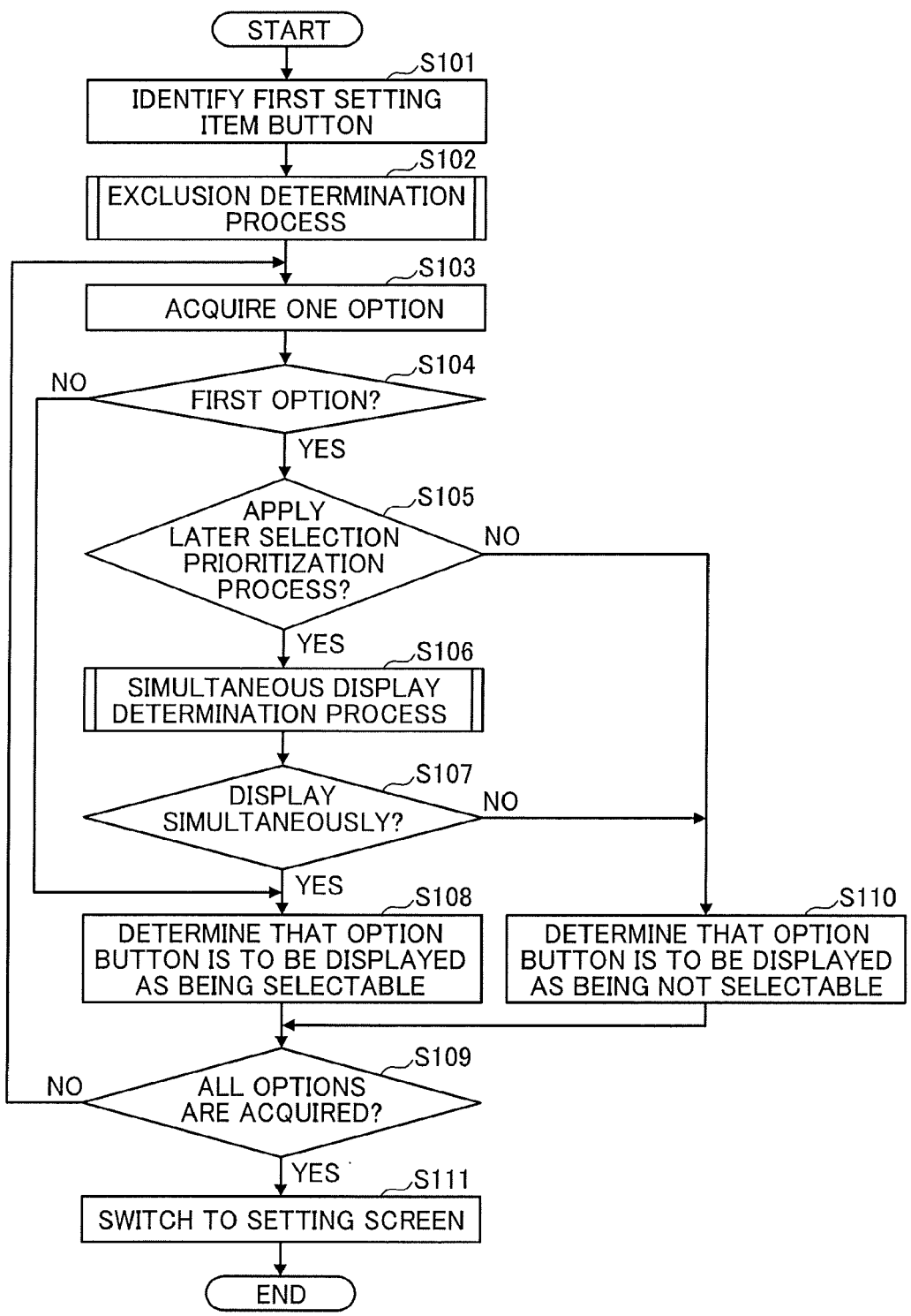
FIG. 16 is a flowchart illustrating an example of steps in an operation performed by the image forming apparatus according to an embodiment of the present disclosure.

A description is given hereinafter of an operation performed by the image forming apparatus 1 according to the present embodiment. FIG. 16 is a flowchart illustrating an example of steps in an operation performed by the image forming apparatus 1. The operation of FIG. 16 starts when a user selects the first setting item button on the application screen.

When the first setting item button is selected, the display control 11 obtains the position of the selected first setting item button, and searches the setting item table (FIG. 13) using the obtained position as a search key to identify the first setting item button (S101).

The display control 11 may obtain the position of the selected first setting item button from the touch panel. Alternatively, the display control 11 may obtain a coordinate of the selected setting item button from the touch panel, and thereby calculate the position of the first setting item button based on the obtained coordinate.

After identifying the first setting item button, the display control 11 requests the exclusion determination unit 12 to perform the exclusion determination. At this time, the display control 11 passes the setting item ID of the first setting item to the exclusion determination unit 12.

In response to the request for exclusion determination, the exclusion determination unit 12 performs the exclusion determination to determine whether the first setting item has the first option (S102). More specifically, the exclusion determination unit 12 determines whether the options that the first setting item has include an option that is in an exclusive relationship with any of currently selected options that the setting item other than the first setting item has. A detailed description is given later of the exclusion determination process. Upon completion of the exclusion determination process, the exclusion determination unit 12 passes the determination result to the display control 11. The determination result includes, for each option that the first setting item has, information indicating whether it is the first option, the exclusion process applied to the corresponding second option, and the setting item ID of the corresponding second setting item.

In response to receiving the determination result, the display control 11 obtains one option from among the options that the first setting item has (S103). The display control 11 may obtain one option randomly. Alternatively, the display control 11 may obtain one option in ascending or descending order of the option IDs.

Upon obtaining one option, the display control 11 determines whether the obtained option is the first option (S104). When the obtained option is not the first option (S104: NO), the display control 11 determines that the option button corresponding to the obtained option is to be displayed as being selectable (S108). Thereafter, the operation proceeds to S109. A detailed description is given later of S109.

By contrast, when the option obtained at S103 is the first option (S104: YES), the display control 11 determines whether the exclusion process applied to the second option corresponding to the obtained option is the later-selection prioritization process (S105).

When the exclusion process applied to the second option is the earlier-selection prioritization process (S105: NO), the display control 11 determines that the option button corresponding to the first option is to be displayed as being not selectable (S110). Thereafter, the operation proceeds to S109.

By contrast, when the exclusion process applied to the second option is the later-selection prioritization process (S105: YES), the display control 11 requests the simultaneous display determination unit 13 to perform the simultaneous display determination. At this time, the display control 11 passes the setting item ID of the second setting item corresponding to the first option to the simultaneous display determination unit 13.

In response to receiving the request for simultaneous display determination, the simultaneous display determination unit 13 performs the simultaneous display determination to determine whether the first setting item button and the second setting item button are simultaneously displayed on the application screen (S106). A detailed description is given later of the simultaneous display determination process. Upon completion of the simultaneous display determination process, the simultaneous display determination unit 13 passes the determination result to the display control 11. The determination result includes information indicating whether the first setting item button and the second setting item button are simultaneously displayed on the application screen.

When the first setting item button and the second setting item button are simultaneously displayed (S107: YES), the display control 11 determines that the option button corresponding to the first option is to be displayed as being selectable (S108). Thereafter, the operation proceeds to S109.

By contrast, when the first setting item button and the second setting item button are not simultaneously displayed (S107: NO), the display control 11 determines that the option button corresponding to the first option is to be displayed as being not selectable (S110). This is equivalent to changing the exclusion process applied to the first option from the later-selection prioritization process to the earlier-selection prioritization process. Thereafter, the operation proceeds to S109.

At S109, the display control 11 determines whether the display control 11 has obtained all of the options of the first setting item (S109). When any option that has not been obtained yet is present (S109: NO), the operation returns to S103. At S103, the display control 11 obtains the next option. The image forming apparatus 1 repeats the processes from S103 to S110 to determine, for all of the options that the first setting item has, a manner in which the corresponding option button is to be displayed.

After determining, for all of the options that the first setting item has, the display manner of the corresponding option button, the display control 11 switches the application screen to the setting screen of the first setting item (S111). The display control 11 displays each option button on the setting screen according to the display manner determined at S108 or S110.

As a result, among the options that the first setting item has, an option button corresponding to an option other than the first option is displayed on the setting screen as being selectable. Further, the option button corresponding to the first option that is in an exclusive relationship with the second option to which the earlier-selection prioritization process is applied is displayed as being not selectable on the setting screen. Furthermore, the option button corresponding to the first option that is in an exclusive relationship with the second option to which the later-selection prioritization process is applied is displayed as being selectable on the setting screen, in a case in which the first setting item and the second setting item are simultaneously displayed on the application screen. Furthermore, the option button corresponding to the first option that is in an exclusive relationship with the second option to which the later-selection prioritization process is applied is displayed as being not selectable on the setting screen, in a case in which the first setting item and the second setting item are not simultaneously displayed on the application screen.

Hereinafter, a description is given of a specific example of the above operation performed by the image forming apparatus 1. In the following description, it is assumed that the first setting item button is a collate button. Further, in the following description, it is assumed that the setting item table of FIG. 13, the option table of FIG. 14, and the highlighted format table of FIG. 15 are provided.

In response to selection of the first setting item button, the display control 11 obtains the position "9" of the first setting item button. Further, the display control 11 searches the setting item table using the obtained position "9" as a search key, and thereby identifies the collate button as the first setting item button (S101). The display control 11 requests the exclusion determination unit 12 to perform the exclusion determination. At this time, the display control 11 passes the setting item ID "08" of the setting item "collate" to the exclusion determination unit 12.

In response to the request for exclusion determination, the exclusion determination unit 12 performs the exclusion determination process to determine whether the first setting item has the first option (S102). Upon completion of the exclusion determination process, the exclusion determination unit 12 passes the determination result to the display control 11. The determination result incudes, for each of the options "none", "collate" and "rotating collate" that the setting item "collate" has, information indicating whether the option is the first option, the exclusion process applied to the corresponding second option, and the setting item ID of the corresponding second setting item.

In this example, the determination result is as follows. That is, the option "none" is not the first option. Further, the option "collate" is the first option, and the corresponding second option is "blank", to which the earlier-selection prioritization process is applied. The setting item ID of the corresponding second setting item "slip sheet" is "10". The option "blank" is an option indicating that copying is not to be performed on a ship sheet. Furthermore, the option "rotating collate" is the first option, and the corresponding second option is "upper left corner", to which the later-selection prioritization process is applied. The setting item ID of the corresponding second setting item "staple" is "06".

In response to receiving this determination result, the display control 11 firstly selects (obtains) the option "none" from among the options "none, "collate", and "rotating collate (S103). As described above, the option "none" is not the first option (S104: NO). Therefore, the display control 11 determines the "none" button is to be displayed as being selectable (S108).

Next, the display control 11 selects (obtains) the option "collate" (S103). As described above, the option "collate" is the first option (S104; YES), and the earlier-selection prioritization process is applied to the corresponding second option "blank" (S105: NO). Therefore, the display control 11 determines that the collate button is to be displayed as being not selectable (S110).

Subsequently, the display control 11 selects (obtains) the option "rotating collate" (S103). As described above, the option "rotating collate" is the first option (S104: YES), and the later-selection prioritization process is applied to the corresponding second option "upper left corner" (S105: YES). Accordingly, in a case in which the collate button (the first setting item button) and the staple button (the second setting item button) are simultaneously displayed (S107: YES) as illustrated in FIG. 7, the display control 11 determines that the rotating collate button is to be displayed as being selectable (S108). By contrast, in a case in which the collate button (the first setting item button) and the staple button (the second setting item button) are not simultaneously displayed (S107: NO) as illustrated in FIG. 10, the display control 11 determines that the rotating collate button is to be displayed as being not selectable (S110).

After determining the display manner for all of the options "none", "collate" and "rotating collate" (S109: YES), the display control 11 switches the application screen to the setting screen of the setting item "collate" (S111). More specifically, the display control 11 displays, on the setting screen, the none button as being selectable and the collate button as being not selectable. Further, the display control 11 displays the rotating collate button as being selectable or not being selectable on the setting screen depending on the determination result of simultaneous display determination.

Figure 17:
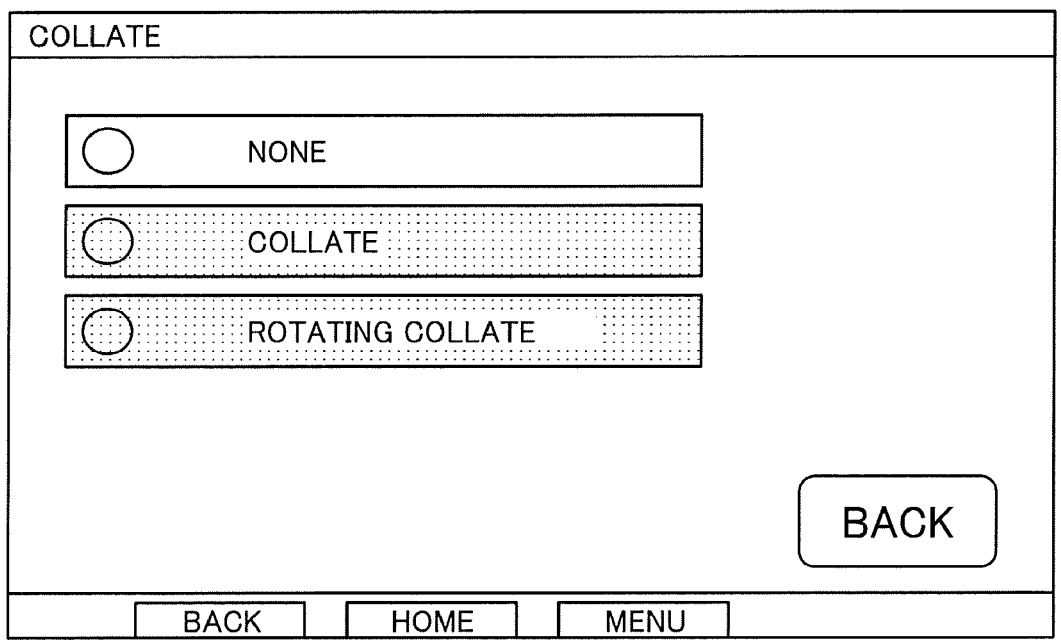
FIG. 17 illustrates an example of the setting screen of a setting item "collate" according to a first embodiment of the present disclosure.

FIG. 17 illustrates an example of the setting screen of the setting item "collate" according to the present embodiment. On the setting screen of FIG. 17, the none button, the collate button, and the rotating collate button are displayed. FIG. 17 illustrates an example case in which the collate button and the staple button are not simultaneously displayed in the same manner as FIG. 10. Accordingly, the none button is displayed as being selectable, while the collate button and the rotating collate button are displayed as being not selectable. This means that a user is able to select the option "none" on the setting screen of FIG. 17, while the user is not able to select the options "collate" and "rotating collate" on the same setting screen.

In a case in which the option button is to be displayed as being not selectable, it is preferable that the display control 11 displays the option button that can be selected in a different manner from the option button that cannot be selected, as illustrated in FIG. 17. For example, the display control 11 may display the option button that cannot be selected with lower brightness than the option button that can be selected. Displaying an object with lower brightness like this is referred to as "half-luminance display". In addition, the display control 11 may display the option button that cannot be selected with a different color (for example, gray) from the option button that can be selected. This change in display manner of the option button that cannot be selected enables a user to visually recognize that the option button cannot be selected. As a result, unnecessary operation by a user (operation to select an option that cannot be selected) can be suppressed.

When the user selects an option button that cannot be selected, the display control 11 may display a message like "this option cannot be selected" on the display. This ensures that a user is informed that the option button cannot be selected.

Figure 18:
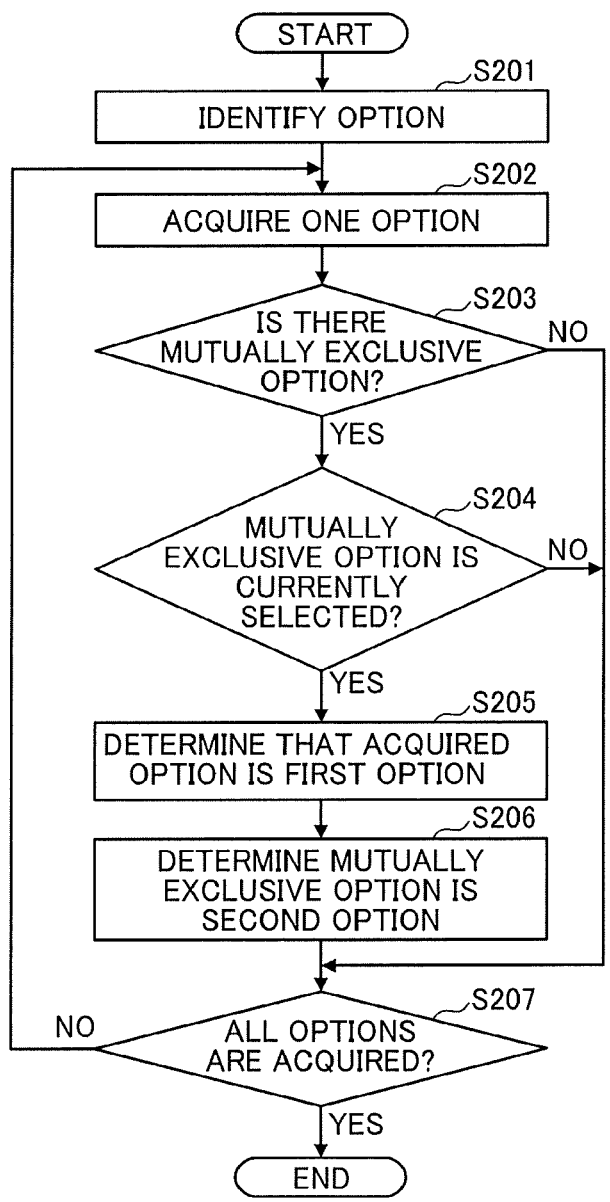
FIG. 18 is a flowchart illustrating an example of steps in an exclusion determination process according to an embodiment of the present disclosure.

Next, a detailed description is given of the exclusion determination process. FIG. 18 is a flowchart illustrating an example of steps in the exclusion determination process. The flowchart of FIG. 18 corresponds to internal processing at S102 of FIG. 16.

In response to receiving the setting item ID of the first setting item from the display control 11, the exclusion determination unit 12 searches the option table (FIG. 14) using the received setting item ID as a search key to identify the options of the first setting item (S201).

Next, the exclusion determination unit 12 obtains one option from the identified options (S202). The exclusion determination unit 12 may obtain one option randomly.

Alternatively, the exclusion determination unit 12 may obtain one option in ascending or descending order of the option IDs.

Subsequently, the exclusion determination unit 12 refers to the option information of the obtained option to determine whether there is an exclusive option corresponding to the obtained option (S203). When there is no exclusive option corresponding to the obtained option (S203: NO), that is, the "exclusive option" is "–", the processing proceeds to S207. A detailed description is given later of S207.

By contrast, when there is an exclusive option corresponding to the obtained option (S203: YES), the exclusion determination unit 12 searches the option table (FIG. 14) using the name of the exclusive option as a search key to obtain the option information of the exclusive option. Further, the exclusion determination unit 12 refers to the option information of the obtained exclusive option to determine whether the exclusive option is currently being selected (S204).

When the exclusive option is not currently being selected (S204: NO), that is, when "select" is "N", the operation proceeds to S207.

By contrast, when the exclusive option is currently being selected (S204: YES), that is, when "selection" is "Y", the exclusion determination unit 12 determines that the obtained option is the first option (S205).

Further, the exclusion determination unit 12 determines that the above exclusive option is the second option corresponding to the first option (S206). Then, the exclusion determination unit 12 obtains the "setting item ID" and "exclusion process" included in the option information of the exclusive option obtained at S204.

At S207, the exclusion determination unit 12 determines whether the exclusion determination unit 12 has obtained all of the options of the first setting item (S207). When any option that has not been obtained yet is present (S207: NO), the operation returns to S202. At S202, the exclusion determination unit 12 obtains the next option. The image forming apparatus 1 repeats the processes from S202 to S207 to perform the exclusion determination for all of the options that the first setting item has.

After performing the exclusion determination process for all of the options that the first setting item has, the exclusion determination unit 12 ends the exclusion determination process, and passes the determination result to the display control 11.

Figure 19:
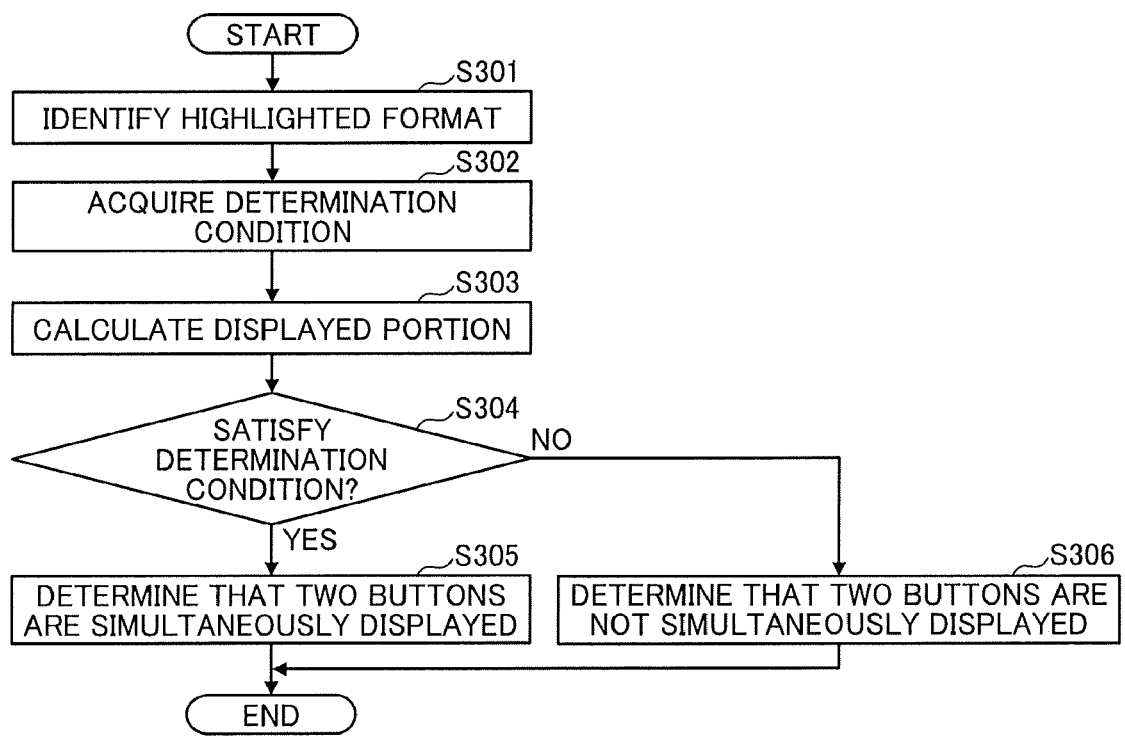
FIG. 19 is a flowchart illustrating an example of steps in a simultaneous display determination process according to an embodiment of the present disclosure.

Next, a detailed description is given of the simultaneous display determination process. FIG. 19 is a flowchart illustrating an example of steps in the simultaneous display determination. The flowchart of FIG. 19 corresponds to internal processing at S106 of FIG. 16.

In response to receiving the setting item ID of the second setting item from the display control 11, the simultaneous display determination unit 13 identifies the highlighted format that is set to the second setting item (S303). More specifically, the simultaneous display determination unit 13 searches the setting item table (FIG. 13) using the received setting item ID as a search key to refer to the setting item information of the second setting item. Further, the simultaneous display determination unit 13 obtains the highlighted format ID included in the setting item information.

Next, the simultaneous display determination unit 13 searches the highlighted format table (FIG. 15) using the obtained highlighted format as a search key to refer to the highlighted format information. Further, the simultaneous display determination unit 13 obtains the determination condition included in the highlighted format information (S302).

Subsequently, the simultaneous display determination unit 13 calculates a display portion of the second setting item button on the application screen (S303). The display portion of the second setting item button can be calculated using any suitable known techniques. For example, the simultaneous display determination unit 13 calculates the coordinate of the second setting item button based on the positions of the first setting item button and the second setting item button and the coordinate of the first setting item button. Then, based on the coordinate of the second setting item button and the size of the second setting item button, the simultaneous display determination unit 13 calculates the portion and ratio of the second setting item button included in the application screen to the entire second setting item button.

After calculating the display portion of the second setting item button, the simultaneous display determination unit 13 determines whether the calculated display portion satisfies the determination condition (S304). For example, in a case in which the predetermined portion of the second setting item button indicated by the determination condition is an upper one-third portion, the simultaneous display determination unit 13 determines whether the calculated display portion is equal to or more than an upper one-third portion.

When the determination condition is satisfied (S304: YES), the simultaneous display determination unit 13 determines that the second setting item button is currently being displayed on the application screen. Accordingly, the simultaneous display determination unit 13 determines that the first setting item button and the second setting item button are simultaneously displayed (S305). With the steps as described above, the simultaneous display determination process ends, and the simultaneous display determination unit 13 passes the determination result to the display control 11.

By contrast, when the determination condition is not satisfied (S304: NO), the simultaneous display determination unit 13 determines that the second setting item button is not currently being displayed on the application screen. Accordingly, the simultaneous display determination unit 13 determines that the first setting item button and the second setting item button are not simultaneously displayed (S306). With the steps as described above, the simultaneous display determination process ends, and the simultaneous display determination unit 13 passes the determination result to the display control 11.

As described heretofore, when the first setting item button selected by a user is not displayed concurrently with the second setting item on the same screen, the image forming apparatus 1 according to the present embodiment displays the first option, which is in an exclusive relationship with the second option, as being not selectable on the setting screen of the first setting item. This prevents the second option from being automatically deselected by the selection of the first option. Accordingly, it is possible to prevent a user from overlooking the change of the setting value of the first setting item. As a result, it is possible to prevent execution of a function by the setting value that a user does not expect.

Second Embodiment

Hereinafter, a description is given of the image forming apparatus 1 according to a second embodiment with reference to FIGS. 20 and 21. The image forming apparatus 1 according to the present embodiment has the same or substantially the same configuration as that of the first embodiment.

When an option button is displayed as being not selectable on the setting screen, a user may not understand why the option button cannot be selected. To address this issue, the image forming apparatus 1 according to the present embodiment display, on the setting screen, a reason why the option button cannot be selected.

In the present embodiment, when displaying the option button that cannot be selected on the setting screen, the display control 11 displays a details button, that enables, when selected, the display control 11 to display the reason why the option button cannot be selected on the setting screen. A plurality of details buttons may be displayed for different option buttons that cannot be selected. Alternatively, one details button may be displayed, that enables, when selected, the display control 11 to display the reason why the option button cannot be selected for all of the option buttons that cannot be selected.

Figure 20:
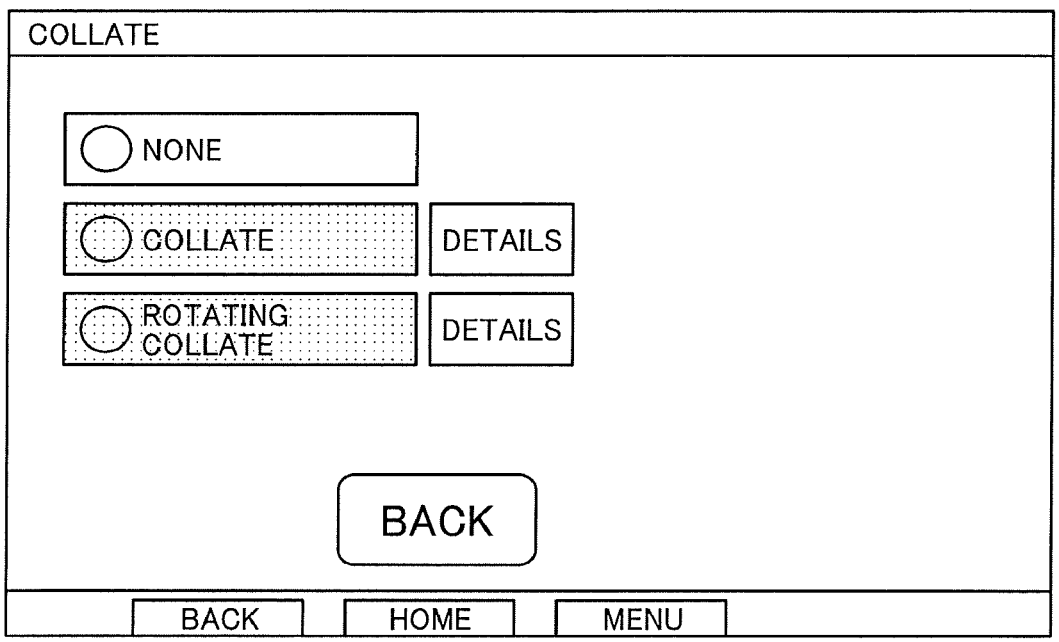
FIG. 20 illustrates an example of the setting screen of a setting item "collate" according to a second embodiment of the present disclosure.

FIG. 20 illustrates an example of the setting screen of the setting item "collate" according to the present embodiment. On the setting screen of FIG. 20, the none button, the collate button, and the rotating collate button are displayed. In an example of FIG. 20, the none button is displayed as being selectable, while the collate button and the rotating collate button are displayed as being not selectable. Further, on the setting screen of FIG. 20, two details buttons are displayed respectively next to the two option buttons that cannot be selected. When any one of the details buttons is selected on the setting screen of FIG. 20, the display control 11 displays, on the setting screen, the reason why the option button corresponding to the selected details button cannot be selected.

Figure 21:
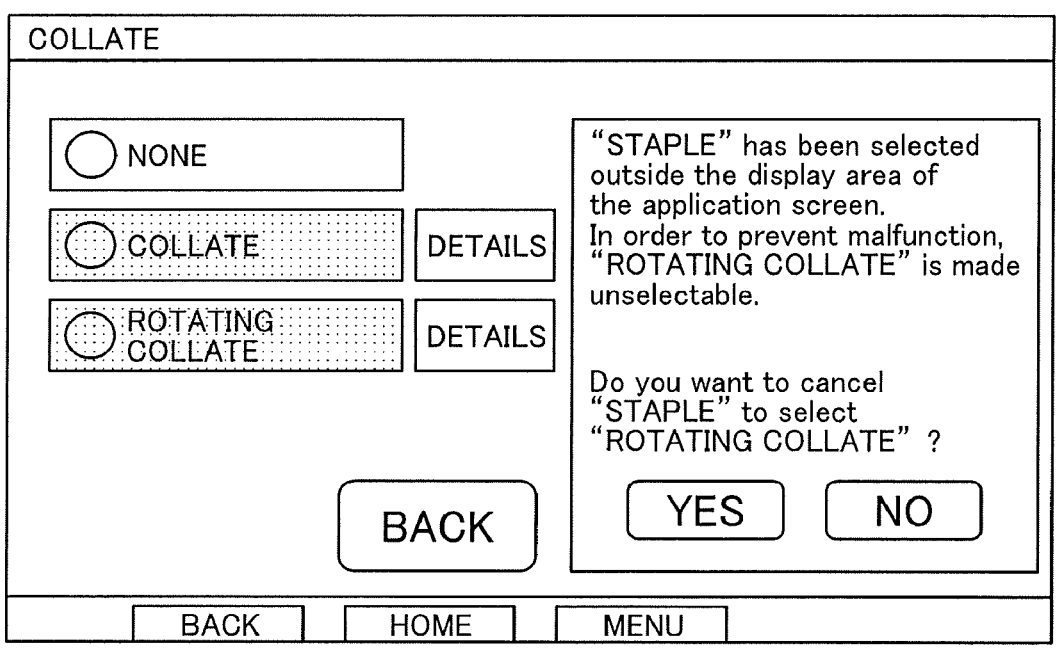
FIG. 21 illustrates another example of the setting screen of a setting item "collate" according to a second embodiment of the present disclosure.

FIG. 21 illustrates another example of the setting screen of the setting item "collate" according to the present embodiment. The setting screen of FIG. 21 is a setting screen displayed in response to selection of the details button corresponding to the rotating collate button on the setting screen of FIG. 20. On the setting screen of FIG. 21, the reason why the rotating collate button cannot be selected (prevention of erroneous operation) is displayed. In addition, the setting screen of FIG. 21 includes a YES button that enables a user to select the option "rotating collate" and a NO button that, when selected, causes the display control 11 to hide the reason why the option button cannot be selected.

In response to user selection of the YES button, the display control 11 selects the option "rotating collate", and deselects the option "upper left corner". The option "rotating collate" corresponds to the first option, and the option "upper left corner" corresponds to the second option. Since an example screen of FIG. 21 explicitly presents that the option "upper left corner" will be deselected by selecting the option "rotating collate", it is possible to prevent the user from overlooking the cancellation of selection of the option "upper left corner" (second option).

As described heretofore, the image forming apparatus 1 according to the second embodiment displays, on the setting screen, the reason why an option button cannot be selected. This enables a user to understand with a simple manner the reason why the option button cannot be selected. This enhances the usability of the image forming apparatus 1.

Third Embodiment

Hereinafter, a description is given of the image forming apparatus 1 according to a third embodiment with reference to FIGS. 22 and 23. The image forming apparatus 1 according to the present embodiment has the same or substantially the same configuration as that of the first embodiment.

In the present embodiment, the display control 11 customizes (deletes or changes the position of) the setting item buttons displayed on the application screen in accordance with a user operation. When customizing the setting item buttons, the display control 11 switches a display state of the application screen to a customization mode.

The application screen is switched to the customization mode when a user long-presses the setting item button or selects a switch button for switching to the customization mode, for example. In the customization mode, the setting item buttons displayed on the application screen can be moved by dragging and dropping. When the user moves a desired setting item button, the display control 11 updates the "position" included in the setting item information of the moved setting item button to the position after the movement.

Figure 22:
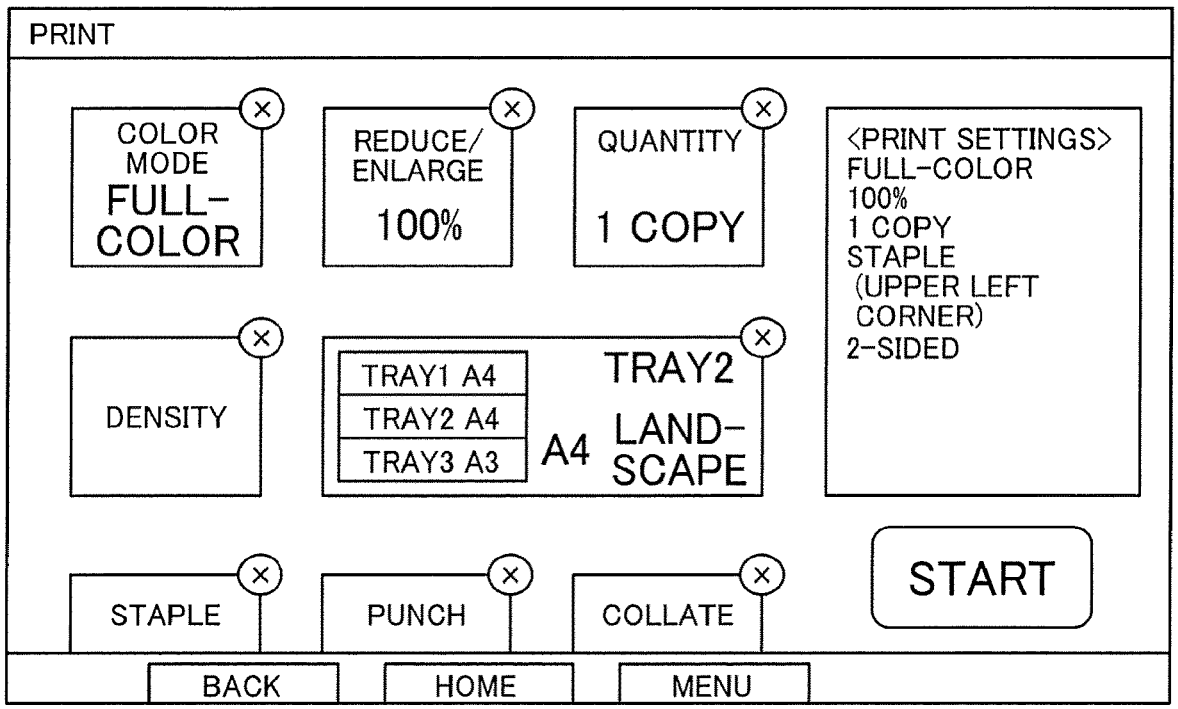
FIG. 22 illustrates an example of the application screen in a customization mode according to an embodiment of the present disclosure.

FIG. 22 illustrates an example of the application screen in the customization mode. When the user replaces the positions of the color mode button and the reduce/enlarge button on the application screen in FIG. 22, the display control 11 changes the "position" included in the setting item information of the setting item "color" from "1" to "2". Further, the display control 11 changes the "position" included in the setting item information of the setting item "reduce/enlarge" from "2" to "1".

Furthermore, in an example of FIG. 22, a hide button (x button) for hiding a setting item button is displayed at the upper right corner of each setting item button. When a user selects the hide button corresponding to a desired setting item button, the display control 11 changes the "display" included in the setting item information of the setting item corresponding to the setting item button from "Y" to "N" to hide the setting item button. This is equivalent to deleting the setting item button from the application screen.

Figure 23:
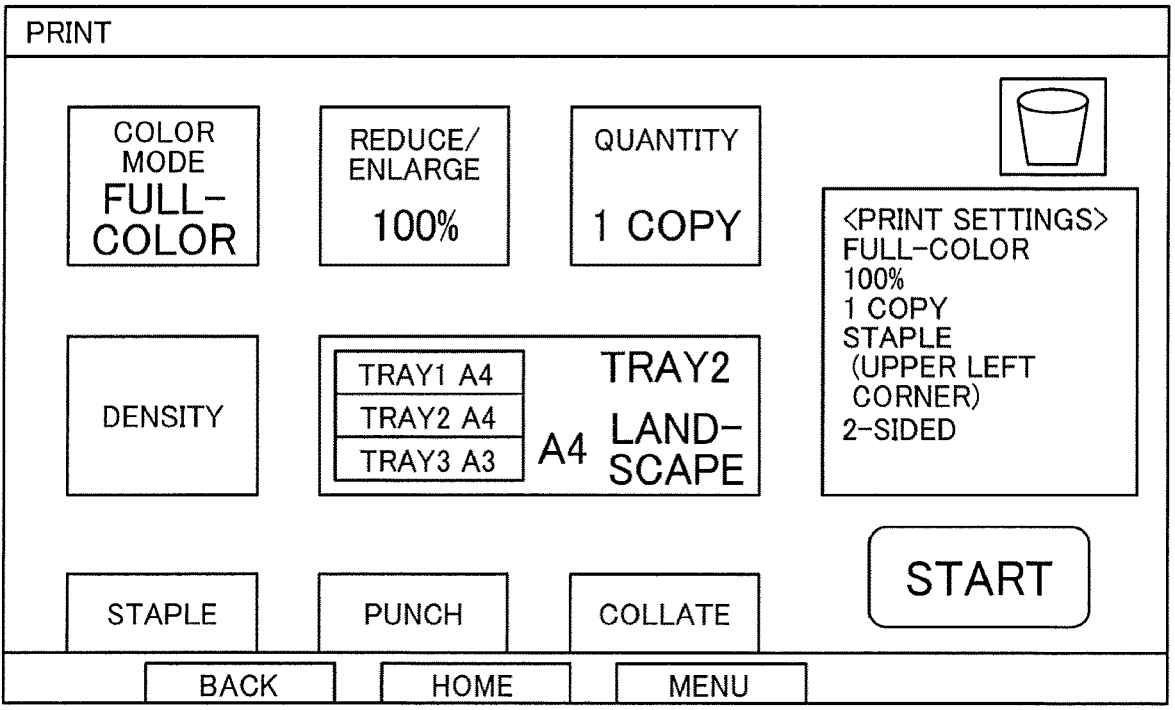
FIG. 23 illustrates another example of the application screen in a customization mode according to an embodiment of the present disclosure.

FIG. 23 illustrates another example of the application screen in the customization mode. In an example of FIG. 23, in place of the hide button, a Trash icon is displayed, which enables, when selected, the display control 11 to hide the setting item button dropped in the Trash icon. When a user drops a desired setting item button to the Trash icon, the display control 11 changes the "display" included in the setting item information of the setting item corresponding to the desired setting item button from "Y" to "N", to hide the setting item button.

As described above, according to the third embodiment, the setting item buttons displayed on the application screen can be customized. This enhances the usability of the image forming apparatus 1. Further, even when the first setting item button and the second setting item button are not simultaneously displayed due to the movement of the setting item button, it is possible to prevent a user from overlooking the change of setting value of the second setting item, in substantially the same manner as the first embodiment. As a result, it is possible to prevent execution of a function by the setting value that a user does not expect.

According to embodiments of the present disclosure, it is possible to prevent overlooking of change in a setting value.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array), SOC (system on chip), GPU, and conventional circuit components arranged to perform the recited functions.

What is claimed is:

1. An information processing apparatus comprising:
    circuitry configured to
        display, on a display, a plurality of setting item buttons corresponding to a plurality of setting items in a predetermined arrangement on a screen, each setting item having a plurality of options;
        in response to selection of a first setting item button from among the plurality of setting items buttons, display a plurality of option buttons corresponding to the plurality of options that a first setting item corresponding to the selected first setting item button has;
        determine, for each of the plurality of options that the first setting item has, whether the option is in an exclusive relationship with any of options that are currently being selected;
        determine whether the first setting item button and a second setting item button corresponding to a second setting item are displayed on a screen simultaneously, the second setting item being a setting item having a currently selected option that is determined to be in the exclusive relationship with any option of the first setting item; and
        display the option button corresponding to the option of the first setting item that is determined to be in the exclusive relationship with the currently selected option, as being not selectable, when the first setting item button and the second setting item button are not displayed on the screen simultaneously,
    wherein the circuitry displays the option button corresponding to the option that is determined to be in the exclusive relationship as being selectable, when the first setting item button and the second setting item button are displayed on the screen simultaneously.

2. The information processing apparatus of claim 1, wherein the circuitry displays the option button corresponding to the option that is determined to be in the exclusive relationship with a brightness level lower than that of other option button being displayed, when the first setting item button and the second setting item button are not displayed on the screen simultaneously.

3. The information processing apparatus of claim 1, wherein the circuitry determines that the first setting item button and the second setting item button are displayed on the screen, based on a state in which a predetermined portion of the second setting item button is simultaneously displayed on the screen as the first setting item button.

4. The information processing apparatus of claim 1, wherein the circuitry displays a message indicating a reason why the option that is determined to be in the exclusive relationship is not selectable.

5. The information processing apparatus of claim 1, wherein the circuitry displays at least a part of the setting item button corresponding to the setting item for which the option is selected in a format different from a manner in which the other setting item buttons are displayed.

6. The information processing apparatus of claim 1, wherein the circuitry displays an entirety or a part of the setting item button corresponding to the setting item for which the option is selected in a color different from the setting item button corresponding to the setting item of which option is not selected.

7. The information processing apparatus of claim 1, wherein the arrangement of the setting item buttons is customizable.

8. A non-transitory computer-executable storage medium storing a computer-executable program that causes a computer to perform an information processing method, the method comprising:
    displaying a plurality of setting item buttons corresponding to a plurality of setting items in a predetermined arrangement on a screen, each setting item having a plurality of options;
    in response to selection of a first setting item button from among the plurality of setting items buttons, displaying a plurality of option buttons corresponding to the plurality of options that a first setting item corresponding to the selected first setting item button has;
    determining, for each of the plurality of options that the first setting item has, whether the option is in an exclusive relationship with any of options that are currently being selected;
    determining whether the first setting item button and a second setting item button corresponding to a second setting item are displayed on a screen simultaneously, the second setting item being a setting item having a currently selected option that is determined to be in the exclusive relationship with any option of the first setting item; and
    displaying the option button corresponding to the option of the first setting item that is determined to be in the exclusive relationship with the currently selected option, as being not selectable, when the first setting item button and the second setting item button are not displayed on the screen simultaneously,
    wherein the displaying of the option button displays the option button corresponding to the option that is determined to be in the exclusive relationship as being selectable, when the first setting item button and the second setting item button are displayed on the screen simultaneously.

9. An information processing method comprising:
    displaying a plurality of setting item buttons corresponding to a plurality of setting items in a predetermined arrangement on a screen, each setting item having a plurality of options;
    in response to selection of a first setting item button from among the plurality of setting items buttons, displaying a plurality of option buttons corresponding to the plurality of options that a first setting item corresponding to the selected first setting item button has;
    determining, for each of the plurality of options that the first setting item has, whether the option is in an exclusive relationship with any of options that are currently being selected;
    determining whether the first setting item button and a second setting item button corresponding to a second setting item are displayed on a same screen simultaneously, the second setting item being a setting item having a currently selected option that is determined to be in the exclusive relationship with any option of the first setting item; and displaying the option button corresponding to the option of the first setting item that is determined to be in the exclusive relationship with the currently selected option, as being not selectable, when the first setting item button and the second setting item button are not displayed on the screen simultaneously, wherein the displaying of the option button displays the option button corresponding to the option that is determined to be in the exclusive relationship as being selectable, when the first setting item button and the second setting item button are displayed on the screen simultaneously.

10. The information processing method of claim 9, wherein the displaying of the option button displays the option button corresponding to the option that is determined to be in the exclusive relationship with a brightness level lower than that of other option button being displayed, when the first setting item button and the second setting item button are not displayed on the screen simultaneously.

11. The information processing method of claim 9, wherein the determining determines that the first setting item button and the second setting item button are displayed on the screen, based on a state in which a predetermined portion of the second setting item button is simultaneously displayed on the same screen as the first setting item button.

12. The information processing method of claim 9, further comprising displaying a massage indicating a reason why the option that is determined to be in the exclusive relationship is not selectable.

13. The information processing method of claim 9, wherein the displaying of the setting item button displays at least a part of the setting item button corresponding to the setting item for which the option is selected in a format different from a manner in which the other setting item buttons are displayed.

14. The information processing method of claim 9, wherein the displaying of the setting item button displays an entirety or a part of the setting item button corresponding to the setting item for which the option is selected in a color different from the setting item button corresponding to the setting item for which the option is not selected.

15. The information processing method of claim 9, wherein the arrangement of the setting item buttons is customizable.

* * * * *